US008421446B2

(12) United States Patent
Straubinger et al.

(10) Patent No.: US 8,421,446 B2
(45) Date of Patent: Apr. 16, 2013

(54) POSITION ENCODER AND A METHOD FOR DETECTING THE POSITION OF A MOVABLE PART OF A MACHINE

(75) Inventors: Franz Straubinger, Aidenbach (DE); Josef Bartl, Buechlberg (DE)

(73) Assignee: Vogt Electronic Components GmbH, Obernzell (DE)

( * ) Notice: Subject to any disclaimer, the term of this patent is extended or adjusted under 35 U.S.C. 154(b) by 79 days.

(21) Appl. No.: 12/303,708

(22) PCT Filed: Jun. 6, 2007

(86) PCT No.: PCT/EP2007/005039
§ 371 (c)(1),
(2), (4) Date: Jun. 4, 2009

(87) PCT Pub. No.: WO2007/141021
PCT Pub. Date: Dec. 13, 2007

(65) Prior Publication Data
US 2010/0156402 A1 Jun. 24, 2010

(30) Foreign Application Priority Data

Jun. 7, 2006 (DE) .......................... 10 2006 026 543
Apr. 16, 2007 (JP) .................................. 2007-107646
Apr. 17, 2007 (WO) ................. PCT/EP2007/003370

(51) Int. Cl.
*G01B 7/14* (2006.01)
(52) U.S. Cl.
USPC .................................................... 324/207.15
(58) Field of Classification Search .................. 324/206, 324/207.11–207.26
See application file for complete search history.

(56) References Cited

U.S. PATENT DOCUMENTS

| 4,356,732 | A | | 11/1982 | Hachtel et al. |
| 4,764,767 | A | | 8/1988 | Ichikawa et al. |
| 4,795,901 | A | * | 1/1989 | Kitazawa ................. 250/231.16 |
| 5,083,468 | A | | 1/1992 | Dobler et al. |
| 5,625,239 | A | * | 4/1997 | Persson et al. .............. 310/68 B |
| 5,633,593 | A | | 5/1997 | Wolff et al. |
| 5,894,678 | A | * | 4/1999 | Masreliez et al. .............. 33/762 |
| 5,920,134 | A | | 7/1999 | Mayer et al. |
| 5,939,879 | A | * | 8/1999 | Wingate et al. .......... 324/207.17 |
| 6,002,250 | A | * | 12/1999 | Masreliez et al. ....... 324/207.16 |
| 6,011,389 | A | * | 1/2000 | Masreliez et al. ....... 324/207.17 |
| 6,181,036 | B1 | | 1/2001 | Kazama et al. |

(Continued)

FOREIGN PATENT DOCUMENTS

| DE | 29 51 148 C2 | 4/1984 |
| DE | 3729230 A1 | 3/1989 |

(Continued)

*Primary Examiner* — Melissa Koval
*Assistant Examiner* — Feba Pothen
(74) *Attorney, Agent, or Firm* — Birch, Stewart, Kolasch & Birch, LLP

(57) ABSTRACT

A rotation angle detection sensor system for a rotational body is provided, which has a reduced sensitivity against an interfering magnetic field and an interfering electric field. The rotation angle detection sensor system comprises an encoder structure that is attached to the rotational body of a machine and is movable along with this rotational body. A stationary sensor assembly is positioned opposite to this encoder structure and supplies at least one sensor signal for determining the angle position. The sensor assembly includes a first inductive element, the inductance of which is dependent on the angle position of the encoder structure.

29 Claims, 20 Drawing Sheets

U.S. PATENT DOCUMENTS

| | | | |
|---|---|---|---|
| 6,208,497 B1 * | 3/2001 | Seale et al. | 361/160 |
| 6,479,987 B1 | 11/2002 | Marx et al. | |
| 6,492,911 B1 | 12/2002 | Netzer | |
| 6,522,128 B1 * | 2/2003 | Ely et al. | 324/207.17 |
| 6,534,970 B1 * | 3/2003 | Ely et al. | 324/207.17 |
| 7,001,246 B2 * | 2/2006 | Hanawa et al. | 451/8 |
| 7,986,139 B2 | 7/2011 | Goto | |
| 2002/0011942 A1 | 1/2002 | Bailey | |
| 2004/0239336 A1 * | 12/2004 | Kesil et al. | 324/635 |
| 2006/0290346 A1 * | 12/2006 | Habenschaden et al. | 324/207.16 |
| 2008/0117083 A1 * | 5/2008 | Mizuta | 341/15 |

FOREIGN PATENT DOCUMENTS

| | | |
|---|---|---|
| DE | 40 26 749 A1 | 2/1992 |
| DE | 43 11 267 A1 | 10/1994 |
| DE | 198 17 356 A1 | 10/1999 |
| DE | 198 16 568 A1 | 11/1999 |
| DE | 10231980 * | 2/2004 |
| DE | 102004033085 A1 | 1/2006 |
| EP | 0 144 803 B1 | 6/1985 |
| EP | 760087 * | 3/1997 |
| EP | 0760087 A1 * | 3/1997 |
| EP | 1475612 A2 | 11/2004 |
| GB | 2190507 A | 11/1987 |
| JP | 62-47501 A | 3/1987 |
| JP | 2002-5688 A | 1/2002 |
| WO | WO 00/63653 A2 | 10/2000 |
| WO | WO 02/084849 A1 | 10/2002 |
| WO | WO 2007/000952 A1 | 1/2007 |

* cited by examiner

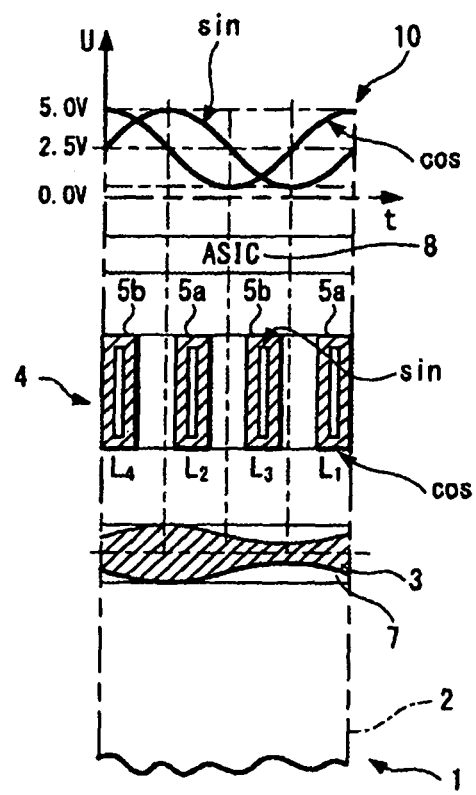

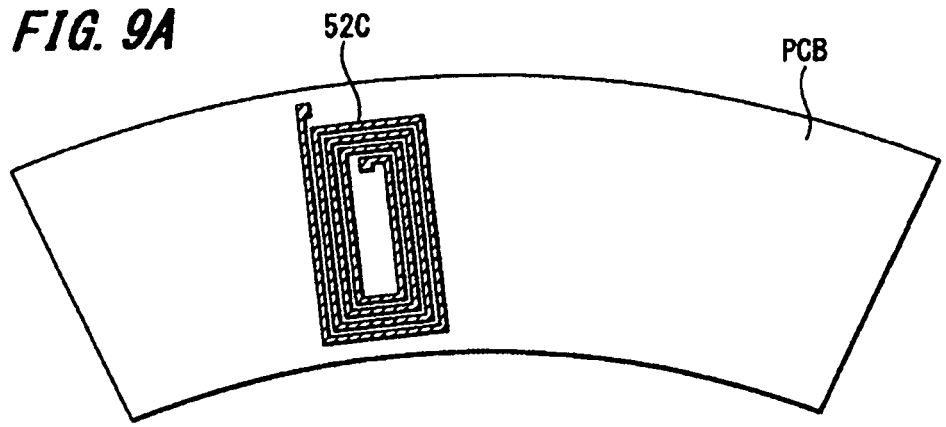
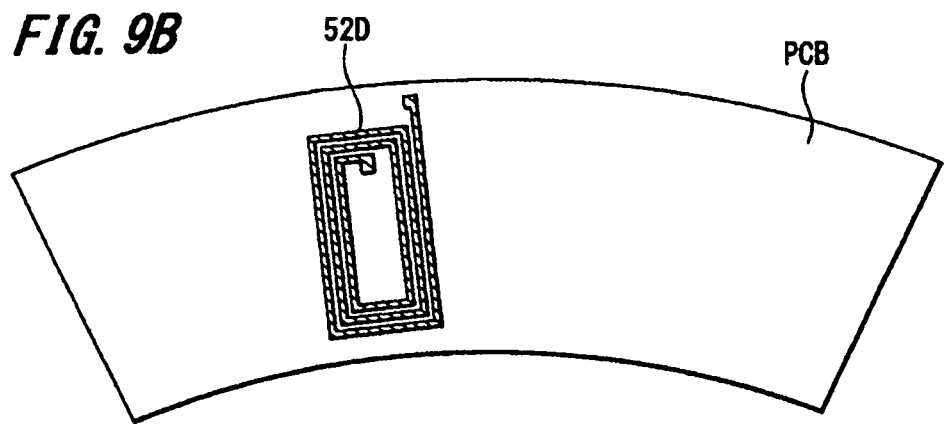
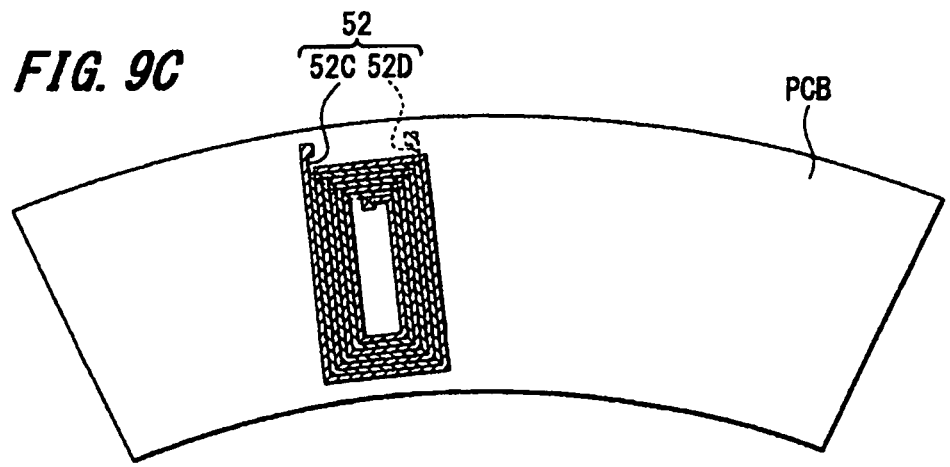

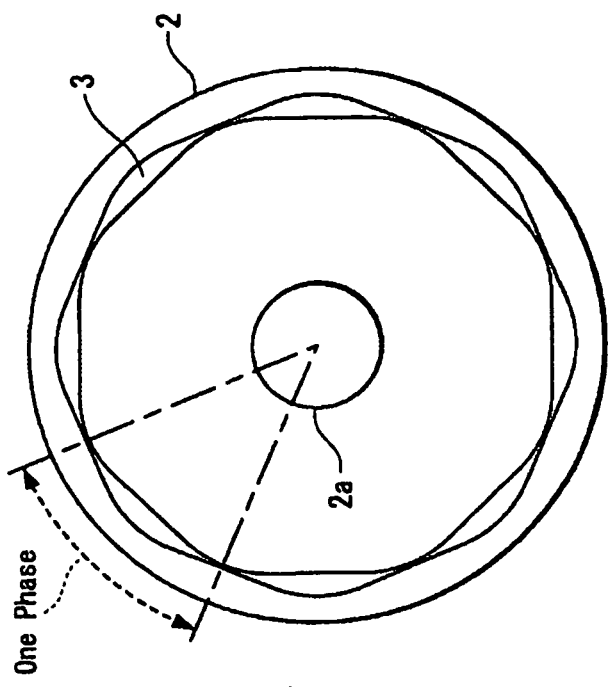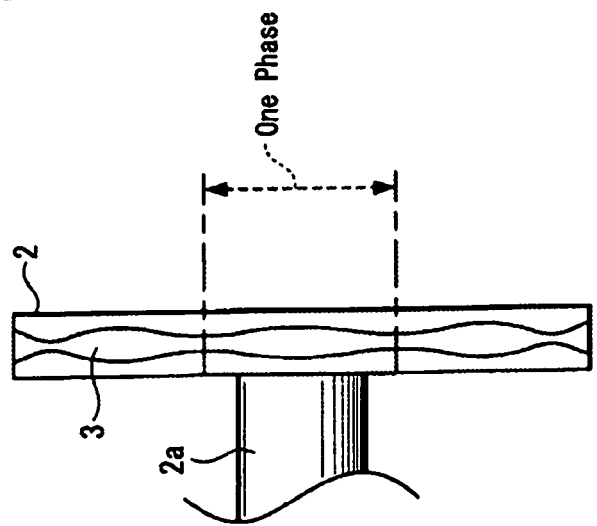

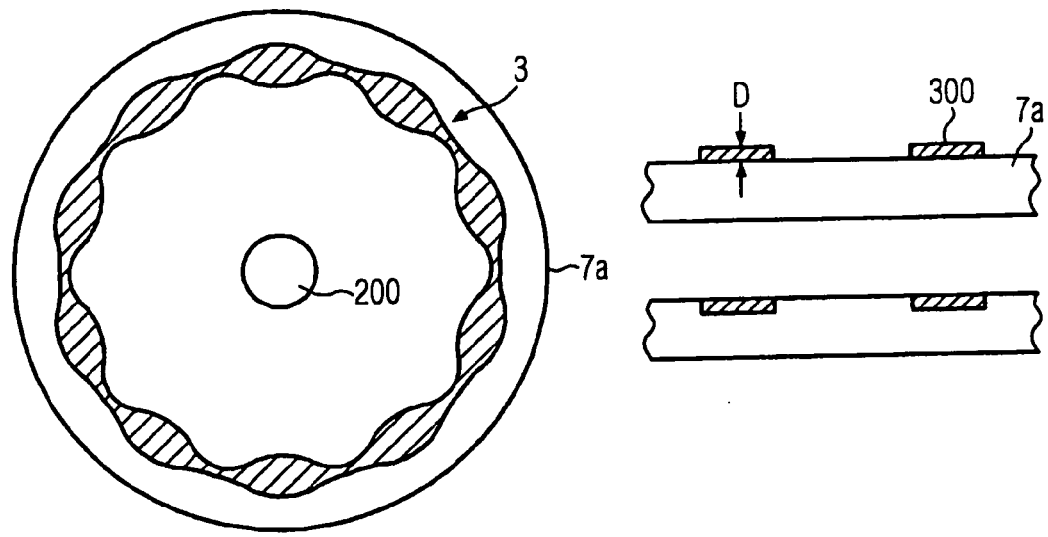
FIG. 16H
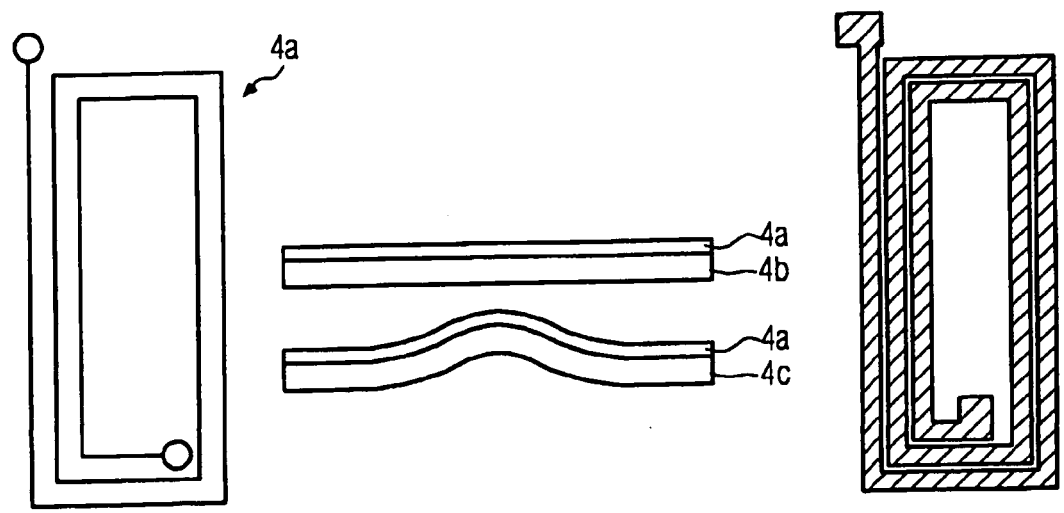
FIG. 16I
FIG. 16J

POSITION ENCODER AND A METHOD FOR DETECTING THE POSITION OF A MOVABLE PART OF A MACHINE

FIELD OF THE PRESENT INVENTION

The present invention relates to a system and a method for detecting the position of a movable part, such as the rotor of a machine, in particular of an electric machine, comprising an encoder structure attached to the rotor and moveable in combination therewith and a stationary sensor assembly located in an opposing relationship to the encoder structure, wherein the sensor assembly provides at least one sensor signal from which the position may be derived.

DESCRIPTION OF THE RELATED ART

An apparatus and a method of the above-described type is known from WO 02/084849 A1. The device described in this document has a ring attached to the rotor with individual segments that are alternately magnetisable. Opposite to the magnetisable ring elements are provided stationary magnet sensor elements. The progression of the induction within the individual segments of the magnetisable sensor rings causes an alternate change of magnetisation in the sensor elements, wherein waveforms of the signals of the sensor elements are generated with a displacement of the electrical angle; from these signals analogue signals may be calculated so as to describe the angular position of the rotor.

Since the well-known sensor is based on a magnetic measurement principle it is therefore sensitive to magnetic and electric interferences. This is particularly disadvantageous when the sensor is to be used in the automotive field, in which the sensor is exposed to harsh environmental conditions and motor currents up to 1 000 Ampere may occur.

It is therefore an object of the present invention to provide a system and a method for detecting the position of the moveable part, such as a rotor, in combination with an associated measurement procedure, which may be less sensitive to magnetic and electric interfering fields.

SUMMARY OF THE PRESENT INVENTION

The object is solved by a system of the type as explained above, in which the sensor assembly comprises a first inductive component and in which the encoder structure is configured to effect a motion depending or a position dependent change of the inductance of the inductive component.

When the encoder structure is moved relative to the sensor assembly due to a motion of the moveable part (rotational body), which in specific embodiments may represent the rotor of an electric machine, the behaviour of at least the inductance of the sensor assembly changes depending on the position of the encoder structure so that upon an appropriate control of the sensor assembly the amplitude and/or the phase and/or frequency of the output signals are changed accordingly. Thus, in the system of the present invention the eddy current losses of the encoder structure, if the same is at least partially comprised of a conductive material—contrary to conventional techniques—may be exploited with respect to influencing the sensor signals of the sensor assembly so that the inventive system may significantly be more robust with respect to electromagnetic influences compared to conventional magnetic measurement procedures.

That is, the operational behaviour of the system is caused by a change in inductance of this inductance element.

For this purpose, the encoder structure may be configured such that a width and an area, or generally a conductivity, change correspondingly to a position thereof, for example. When for instance the width and area of the encoder structure opposing the inductance element change, the inductance of the inductance element changes since an amount of eddy current loss generated in the encoder structure changes.

According to one advantageous embodiment of the present invention the encoder structure comprises a structure periodically changing with respect to an angle, for example, the width and the area change. In this way the sensor assembly may output a periodically changing signal, from which the angular position may be detected.

It may be advantageous when the changing structure has a sinusoidal configuration. According to this arrangement the sensor assembly will be damped due to the sinusoidal track of the encoder structure, thereby allowing a highly efficient evaluation or calculation of the position of the encoder structure. In other embodiments other "damping patterns" may be represented by the encoder structure, such as a triangular structure, an at least partially rectangular structure, in which the width changes at least stepwise, and the like. Generally, other configurations may be used which enable an unambiguous relationship between the change of signal caused by the change of inductance and the position of the rotor.

The encoder structure may preferably be provided on a ring in a radial inner or outer position of the rotor. In this configuration the period of the angle detection during a mechanical revolution of the rotor, if a machine with a rotor is considered, may continuously be repeated. If the encoder structure is attached at the inner side of the rotor it may be advantageous to position the sensor assembly at the inner side opposite to the encoder structure. On the other hand, the sensor assembly will typically be provided outside the rotor, if the encoder structure is attached to the rotor at its outer side.

In other embodiments the encoder structure is provided axially at the rotor. Consequently, a respective sensor assembly of appropriate configuration may then be positioned axially with respect to the rotor.

According to an advantageous embodiment of the invention the sensor assembly comprises at least a sensor system having two resonant circuits fed by an AC voltage source and having inductive components, which generate output signals including position information in a damped state or during the influence on the inductance caused by the encoder structure. From the resonant circuits a phase shift and/or a difference in amplitude may be obtained, which change according to the position of the encoder structure. In this case, the accuracy of the sensor system is determined by the tolerances of the components of the AC voltage source and the components of the resonant circuits, thereby providing efficient operation of the system based on an appropriate quality of the respective components. The resonant circuits may be provided as series resonant circuits or as parallel resonant circuits.

In other embodiments inductive components of the sensor assembly are used as components of oscillators associated therewith and the difference in frequency of the oscillators caused by a change of inductance may be evaluated or calculated so as to obtain the desired position information.

In a particularly advantageous embodiment of the invention the sensor assembly comprises at least two identical sensor systems of the above-described type, which are mechanically displaced to each other. Due to the mechanically displaced sensor systems time-shifted signals of identical shape corresponding to different positions of the encoder structure may be generated, which may be used to precisely determine the absolute position of the encoder structure.

According to an advantageous embodiment of the invention the sensor systems of the sensor assembly are arranged in close proximity to each other. In this way a radial runout or an imbalance of the rotor and the encoder structure attached thereto may be eliminated by a substantially identical change of the sensor output signals.

Advantageously a circuit is provided downstream of the sensor assembly, which converts the at least one sensor signal into a signal comprising the position information. By using the circuit the differences in phase and/or in amplitude and/or in frequency measured by the sensor assembly may be converted into a signal which may directly represent the angular position to be detected.

In some embodiments it may be advantageous when the circuit comprises symmetric channels for tapping and processing the sensor signals of the sensor assembly. When the signals output by the sensor assembly are identical in their signal shape an identical processing of the sensor signal may be ensured due to the symmetric configuration of the circuit channels. In this way, the processed sensor signals may be processed to obtain a highly precise output signal.

In some embodiments the sensor systems are arranged in a displaced manner and in particular may be displaced by 90°. In this way a sinusoidal and cosinusoidal signal may be generated when, for instance, the encoder assembly has a corresponding configuration.

Preferably the frequency of the AC voltage source used for generating oscillations in the sensor assembly is in the range of 500 KHz to approximately 5 MHz. In this range the sensor assembly may highly efficiently be influenced by eddy current losses of the encoder structure.

In some embodiments the resonant circuits are tunes to the frequency of the AC current source. In this way it may be accomplished that the resonant circuits are balanced with respect to manufacturing tolerances in order to obtain a high evaluation sensitivity, wherein the operating frequency may be selected at an appropriate value in the vicinity of the resonance frequency for the damped sensor assembly.

It is particularly advantageous when the signal containing the position information comprises a sinusoidal signal and a cosinusoidal signal and a calculation module is provided downstream which may calculate an inverse tangent function from the sinusoidal signal and the cosinusoidal signal. In this way the angular position may directly be represented.

In a further aspect of the present invention a rotation angle detection sensor system is provided. The system comprises a rotational body and an encoder structure that is attached rotatably along with said rotational body. Furthermore, the system comprises a stationary sensor assembly that has one or more inductance elements and that is disposed in a manner opposing to said encoder structure while having an interval thereto. The rotation angle detection sensor system is characterized in that said one or more inductance elements are formed into a planar shape.

The object of the present invention is also solved by a method for detecting the position of a movable part, such as the rotor, of a machine. The method comprises changing an inductance of a sensor assembly by changing the position of an encoder structure coupled to the movable part, and detecting the change of inductance of the sensor assembly. Moreover, the position of the movable part is determined on the basis of the detected change of the inductance.

This technique based on the principle of eddy currents provides for a substantial insensitivity of the position detection of the moveable part with respect to magnetic and electric interfering fields.

The change of inductance may be detected by a phase difference of two oscillating sensor systems of the sensor assembly.

In this way an efficient evaluation, for instance on the basis of resonant circuits in the sensor assembly may be accomplished, wherein the position dependent eddy current losses in the encoder assembly may be evaluated in a precise manner. For this purpose the evaluation may be accomplished on the basis of an analogue signal having a corresponding phase difference.

In one preferred embodiment the change of the inductance is detected on the basis of the difference in amplitude of two oscillating sensor systems of the sensor assembly.

In a further preferred embodiment the change of inductance is detected by a different in frequency of two oscillating sensor systems of the sensor assembly.

In these cases well-approved signal processing devices, such as a microcontroller or microprocessor, may be used so that a high degree of design flexibility is obtained.

According to a further aspect of the present invention the object is solved by a system is described in the introductory part, wherein the sensor assembly comprises a first inductive component, that is, a coil lacking a magnetic core, and wherein the encoder structure is configured to cause a position dependent value of the inductance of the inductive component.

In addition to the advantageous effects described above, due to the lack of a magnetic core material in the coil external magnetic fields may not contribute to the magnetizing or saturation of the sensor assembly so that the outputs signals obtained may be moderately insensitive to strong magnetic fields, which may particularly occur in electric machines.

For this purpose the conductivity in the encoder is varied in an angle dependent manner so that a high degree of flexibility for the position dependent structuring of the encoder structure is obtained.

In one embodiment the conductive material is provided in the form of at least one trace or track that is passed by the coil upon moving the movable part. The at least one track may be provided according to various ways and at various appropriate positions, for instance outside of strong interfering fields, and the like. The track may be incorporated into a part of the rotor or the track may attached to the rotor by means of an appropriate support structure.

In one embodiment the track comprises a width that varies along the direction of movement so that an efficient position dependent modulation of the conductivity is accomplished.

In a further embodiment the at least one track comprises a constant width, at least within a section, so that the modulation of the conductivity within the section may be obtained by other measures, such as controlled adjustment of the sheet resistance, etc. By changing the width of different sections, each of which comprises a position dependent conductivity, a corresponding offset may be adjusted, thereby providing the possibility to additionally encode information into the at least one track.

In one illustrative embodiment an area fraction of an electrically conductive material varies within a section along the direction of motion, thereby obtaining an efficient modulation. For this purpose a specifically applied material may selectively be removed, or a base material of the rotor may appropriately be patterned in order to obtain the position dependent area fraction.

In this case, the averaged conductivity may vary, at least on the basis of sections, in the direction of motion, thereby providing the potential to obtain a coarser and finer position resolution within a single track. For example, the desired angle resolution may depend on the number of pole pairs, while the coarse resolution may refer to the position of the various pole pairs and thus to the position for an entire revolution.

In a further embodiment a first track and a second track are provided in the encoder structure, and the sensor assembly comprises a second coil without a magnetic core, wherein the first coil is guided along the first track and the second coil is guided along the second track. In this way the size of the sensor assembly with respect to the direction of motion may be reduced by using a plurality of coils, and/or tracks having a different spatial resolution may be used.

In a further embodiment the movable part is made of a base material and the encoder structure is realized by modifying the conductivity of a portion of the base material. In this way the encoder structure may be formed on the basis of existing components of the movable part so that the volume required by the encoder structure and possibly the effort for fabricating may be reduced.

In a further embodiment the movable part is made of a conductive base material and the encoder structure is formed by attaching to and/or incorporating into the base material a material of reduced conductivity or increased conductivity. For instance, a layer of a highly conductive material may directly be deposited on the movable part if made of a material of inferior conductivity. For example, the base material comprises steel and the material for forming the encoder structure comprises copper, copper alloy, silver, alloys thereof, and the like.

The material used for forming the encoder structure may be incorporated in the base material such that a substantially planar surface is obtained.

In a further embodiment a layer thickness of the material is less than 40 µm and preferably ranges from 2 µm to 35 µm.

In a further embodiment the encoder structure comprises a conductive punching or stamping part. In this way the modulation of the conductivity may be achieved by a cost efficient fabrication process, which may be performed on the basis of large piece numbers and with reduced manufacturing tolerances.

In a further embodiment the encoder structure comprises an embossed conductor structure, thereby also obtaining the above-mentioned advantages.

In a further embodiment the encoder structure comprises a printed conductor structure. In this way nearly any shape may be realized for the track, so that in view of evaluating the sensor signals an appropriate design may be selected with high reproducibility and with very precisely defined lateral dimensions.

In a further embodiment the encoder structure comprises a molded integrated device (MID). According to this technology respective three-dimensional conductor structures may be formed, which are thus adaptable to the shape of the rotor or other carrier materials.

In addition to shapes of the encoder structure discussed in the previous aspects, the conductivity may vary in a step wise manner, thereby realizing a step function which may represent an approximation of a desired shape, such as a sine wave form, thereby facilitating the fabrication of the conductive structure.

In addition to the aspects of the coils discussed so far, in some embodiments the first coil comprises a planar coil. By this geometry a reduced volume may be achieved by using a plurality of manufacturing techniques and carrier materials.

For example, the planar coil is provided as a conductive line on a carrier material. In this case well-established manufacturing processes as used in the field of printed wiring boards and also in the field of semiconductor production may be used. Hence, appropriate materials, such as FR4, ceramics, and the like, may be used. However, other substrates, such as insulators, semiconductors and the like may be used in combination with appropriate manufacturing techniques.

In one embodiment portions of the planar coil are formed on different layers of the carrier material, so that each individual layer may be formed in a planar manufacturing technique, while nevertheless a high number of windings may be provided. For instance, the carrier material comprises a multi layer board.

In a further embodiment the carrier material is a foil material so that the coil may be brought into a desired shape for enhancing the efficiency or for enhancing the incorporation into the machine.

Furthermore, the carrier material may be a moulded integrated device (MID).

In a further embodiment the first coil comprises a wound coil mounted on a carrier material. In this way a high number of windings and thus a high efficiency may be obtained, wherein the coil has the characteristic of an air gap coil, thereby providing for reduced sensitivity to interferences, as previously explained.

In a further embodiment the sensor assembly comprises a second oscillating circuit having a coil that may have substantially the same configuration as the first coil.

In a further embodiment the first and second coils are positioned along the direction of motion of the rotor with a spacing that corresponds to a phase difference of 180° with respect to the individual output signals of the first and second coils. Thus, by obtaining the difference of the respective signals interfering components may efficiently be suppressed.

In addition to embodiments referring to the circuit provided to obtain the output signal(s) of the sensor assembly, in one advantageous embodiment the sensor assembly and the circuit are spatially separated from each other are connected by a wired connections, such as a cable. In this way, the sensor assembly may be positioned in the machine independently with respect to the circuit, so that a position may be selected for the circuit that is appropriate for instance in view of the environmental conditions.

In a further embodiment the sensor assembly is provided without active electronic components, thereby allowing the sensor assembly to be positioned at or integrated in areas of increased temperature without necessitating increased requirements for the circuit which may otherwise lead to increased manufacturing costs.

In a further aspect the invention relates to a method of forming a rotor position sensor system for a machine. The method comprises providing an encoder structure that is rotated together with the rotor and that has a conductivity depending on the angular position of the rotor. The method further comprises providing a sensor assembly that may be positioned stationarily relative to the encoder structure and that may provide an angle dependent output signal by eddy currents caused in the encoder structure. Furthermore, an electronic circuit is provided for processing the angle dependent output signal, wherein at least the electronic circuit is injection moulded. In this way an enhanced reliability of the circuit is achieved, in particular at sophisticated conditions as are encountered in the automotive field.

In one embodiment the electronic circuit is formed on a carrier which is directly injection moulded, thereby achieving a cost efficient manufacturing process. In other cases the electronic circuit is installed in a housing and the housing is injection moulded substantially without air enclosures.

In a further embodiment the sensor assembly and the electronic circuit are injection moulded in a common process, thereby resulting in a compact structure.

In a further embodiment providing the encoder structure comprises modifying the conductivity of a portion of the rotor of the machine. In this way, components required for the fabrication of the rotor anyway may be used for forming the encoder structure, thereby obtaining advantages in terms of size, manufacturing costs, and the like.

The modification of the conductivity may comprise the deposition on and/or the incorporation of an electrically conductive material into a base material of the rotor.

In one embodiment providing the encoder structure comprises forming a conductive structure by punching, stamping, embossing, printing or 3-dimensional moulding (MID).

In one embodiment a cable connection is provided between the sensor assembly and the electronic circuit so that the electronics may be positioned outside areas suffering from increased environmental influences.

BRIEF DESCRIPTION OF THE DRAWINGS

Further advantageous embodiments are defined in the appended claims. Additionally, further embodiments of the present invention will be described hereinafter with reference to the figures in which.

FIG. 2 schematically illustrates the configuration of sensor coils in relation to the encoder structure and the respective sensor signals obtained therefrom according to an embodiment of the present invention;

FIGS. 9 A to 9 C are diagrams showing other configuration examples of plural inductance elements;

FIGS. 10 A and 10 B are diagrams showing a configuration example of an encoder structure according to an embodiment of the present invention;

FIG. 16 C depicts a radial arrangement of a sensor system;

FIGS. 16 D to 16 G schematically illustrate various tracks for modulating the conductivity according to illustrative embodiments;

FIG. 16 H shows the attaching or deposition of a track on a carrier material;

FIGS. 16 I to 16 L depict various air gap coils used in the sensor system of the present invention;

FIGS. 16 M and 16 N illustrate several encoder tracks and respective coils of further embodiments; and FIG. 16 O schematically illustrates a sensor system having a circuit and a coil assembly that are spatially separated.

DETAILED DESCRIPTION

Figure 1A:
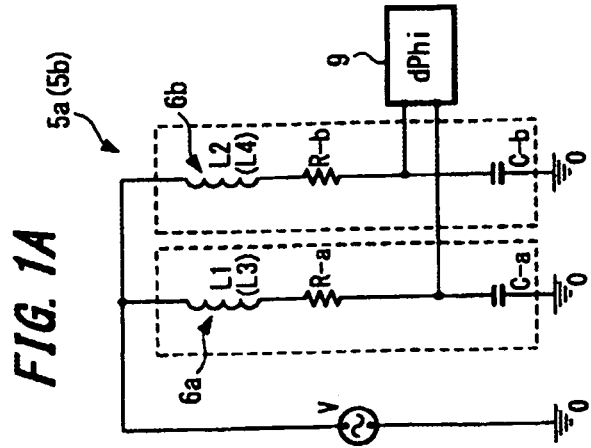
FIGS. 1A-1E are examples of a sensor system according to embodiments of the present invention in which series resonant circuits, parallel resonant circuits and oscillators with inductances coupled thereto are provided so as to detect a change in inductance caused by an encoder structure.
Figure 1B:
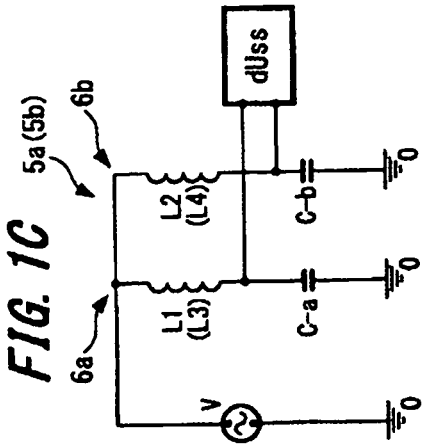
Figure 1C:
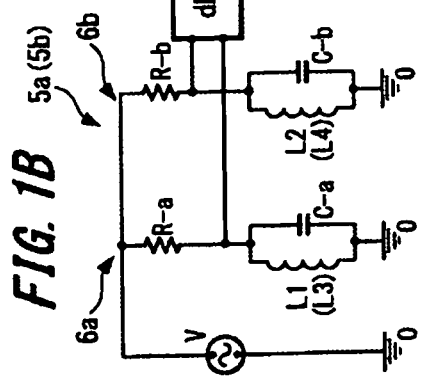
Figure 1D:
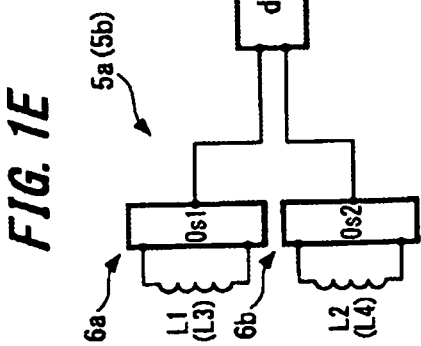
Figure 1E:
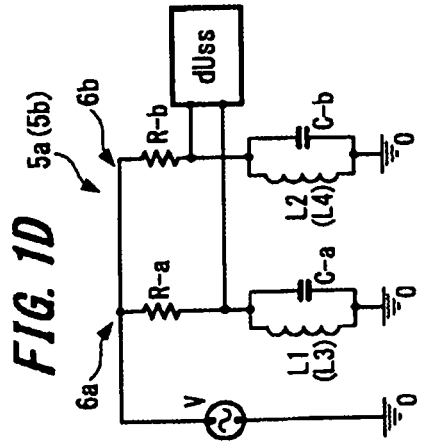

FIG. 1 A to FIG. 1 E show basic structures of sensor systems 5 used in an embodiment of the present invention.

The sensor system 5 is an inductive position sensor. This inductive position sensor is practically configured to have two resonance circuits 6a and 6b that are provided in a parallel configuration according to the embodiment of FIG. 1 A. The resonance circuit 6a includes a coil or inductance L1, a resistor R-a and a capacitor C-a, which are connected in series, and the resonance circuit 6b includes a coil or inductance L2, a resistor R-b and a capacitor C-b, which are connected in series.

It is desirable that the inductances L1 and L2 are provided in a planar type (planar form) configuration. The capacitors C-a and C-b are provided as separate devices in the embodiment shown exemplarily.

The voltage is supplied to the two resonance circuits 6a and 6b by an AC voltage source V that is connected in parallel with both resonance circuits. A frequency f of the AC voltage source V is typically set in a range from approximately 500 kHz to approximately 5 MHz.

The series resonance circuits 6a and 6b are synchronized with the frequency f of the AC voltage source V and are adjusted to a non-operational state, more specifically a state close to a resonance frequency without attenuation. Thus, it is possible to obtain high sensitivity of the series resonance circuits 6a and 6b and, in this case, a certain degree of tolerance related to an interval between an encoder structure and the inductance elements L1, L2 can be stabilized by selecting appropriately an operation frequency as explained later by referring to FIG. 15. The accuracy of this adjustment is determined depending on the tolerances of configuration elements of the AC voltage source V and depending on the devices L, R and C of the series resonance circuits 6a and 6b. The smaller those tolerances are, the more the operational performance of the sensor system 5 improves.

In a case that a movable conductive structure, which is the encoder structure, enters magnetic fields of the inductors L1 and L2, the generated eddy current causes to generate a phase difference between the two resonance circuits 6a and 6b. This phase difference practically depends on the encoder structure and the quality of the resonance circuits 6a and 6b as explained below in detail. There is such a case that the phase difference of maximum +/−90°, more specifically dPhi of 180°, is generated.

FIG. 1 B shows an embodiment in which the resonance circuits 6a and 6b mean the parallel resonance circuits and the signals are obtained from respective nodes between the respective resistors R-a, R-b and the parallel resonance circuits related to the respective resistors. Also, in this case, it is possible to obtain the phase difference that is dependent on the change in the inductance generated by the encoder structure.

FIG. 1 C shows another embodiment in which the resonance circuits 6a and 6b are provided as the series resonance circuits. In this case, a difference dUss of the maximum voltages of both circuits, which means the amplitude difference, is obtained as a basis for the change in the inductance indicating the position information.

FIG. 1 D shows an embodiment in which the resonance circuits 6a and 6b are provided as the parallel resonance circuits to determine the amplitude difference dUss.

FIG. 1 E shows an embodiment in which the inductance elements L1 and L2 are connected with respective oscillators Os1 and Os2; therefore, those inductance elements partially form the corresponding oscillators to detect an oscillation behavior to the change in the inductance; and thereby a frequency difference df is determined.

FIG. 2 shows schematically a configuration of an encoder structure 3 related to a sensor assembly 4. In this embodiment, the sensor assembly 4 includes a first sensor system 5a having the inductance elements L1 and L2 of the sensor system 5 as shown in FIG. 1 and a second sensor system 5b having inductance elements L3 and L4, and further includes a signal processing circuit 8 and a voltage signal U to time t that is obtained from the signal processing circuit 8 according to an embodiment of the present invention.

In the embodiment to be explained hereinafter, the encoder structure 3 is attached to a surface of a cylinder ring 7 connected with a movable part, which is a rotor 2 of an electric motor 1 in this embodiment, and therefore the encoder structure 3 can move along with the movable part. In an embodiment, the electric motor means a machine performing a permanent magnetic excitation in which an angular signal is used for electrical rectification. However, in another embodiment of the present invention, the encoder structure 3 may be provided in an inner side portion in the radial direction of the rotor 2. According to another advantageous embodiment of the present invention, the encoder structure 3 can be also provided in the axial direction of the rotor 2.

In the embodiment shown in this figure, the encoder structure 3 set in a sine-wave form, is provided in the ring 7 of an outside portion in the radial direction of the rotor 2. The sine-wave shape used therein is advantageous because the encoder structure 3 can provide an attenuation region having a shape of sine trajectory, and subsequently a sensor signal 9 detected in the sensor system 5 is processed into the sine-wave form due to this attenuation region, and therefore it becomes possible to perform easily the evaluation/calculation.

In principle, another structure that changes depending on the angle may be used as the encoder structure 3. A repeating triangular structure may be provided as the encoder structure, for example. Further, it is also possible to use another shape that gives the change in the inductance depending on the position, such as a rectangular structure in which a width changes stepwise, for example.

The encoder structure 3 can be made of aluminum, steel, copper, a wiring board, a conductive foil, or a plastic material containing a metal, for example. Only a requirement is that the structure is conductive or includes a conductive configuration element. The structure is not necessarily a magnet.

The sensor coils L1 and L2 in the forms of the resonance circuits 6a and 6b of the first sensor system 5a, for example, are disposed in a manner opposing to the encoder structure 3, and the sensor coils L3 and L4 of the sensor system 5b are disposed at an angle displacement of 90°. The inductances L1, L2 and L3, L4 of the sensors are disposed in front of the encoder structure 3 such that respective pairs thereof form an angle offset of 180° and, as a result, the respective pairs in the sensor systems 5a and 5b can generate differential signals. Each of those differential signals contains the position of the movable part or rotor 2. Since two sensor systems 5a and 5b are provided, two differential signals having a phase shift by 90° correspondingly to the configuration of the encoder structure 3, which are the sine-wave signal and the cosine-wave signal, for example, can be obtained. It is also possible to obtain an absolute position from those two differential signals, which means that a moving direction of the encoder structure 3 can be also determined.

In a rotation angle detection sensor (hereinafter, referred to as "rotation angle sensor") related to the present invention, the encoder structure (a member that generates the eddy current) attached to the movable part like the rotational body such as the rotor and the inductance elements (or a stationary sensor assembly having the built-in inductance elements) disposed in a manner opposing to the encoder structure are set as an essential configuration.

In other words, the rotation angle sensor can be developed into diverse structural variations by only satisfying with such a structural condition that the aforesaid encoder structure and inductance elements (stationary sensor assembly) are disposed in an opposing relationship, with the advantage that this rotation angle sensor can be flexibly adapted to various usages and a design freedom can be improved.

Figure 3A:
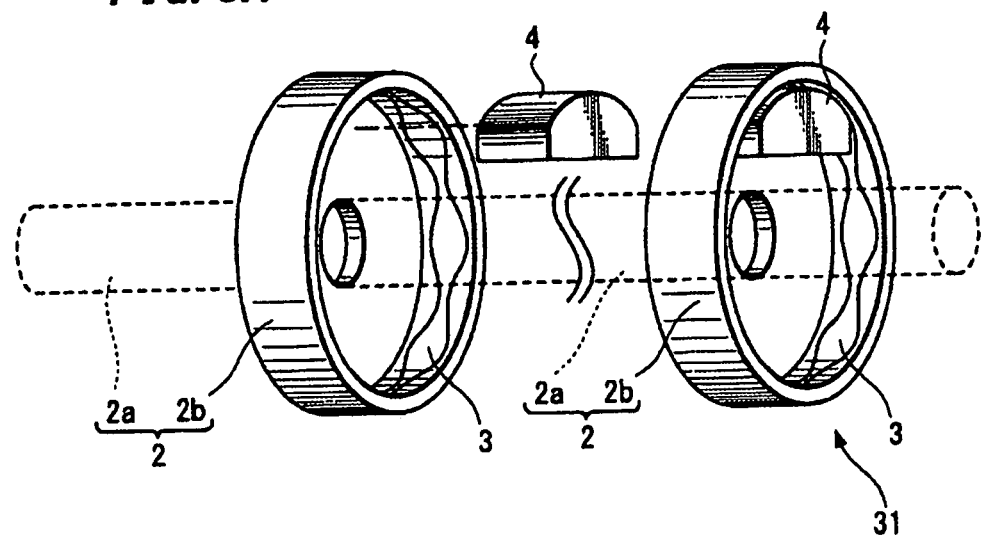
FIGS. 3 A and 3 B are diagrams showing a form of a rotation angle sensor related to the present invention.
Figure 3B:
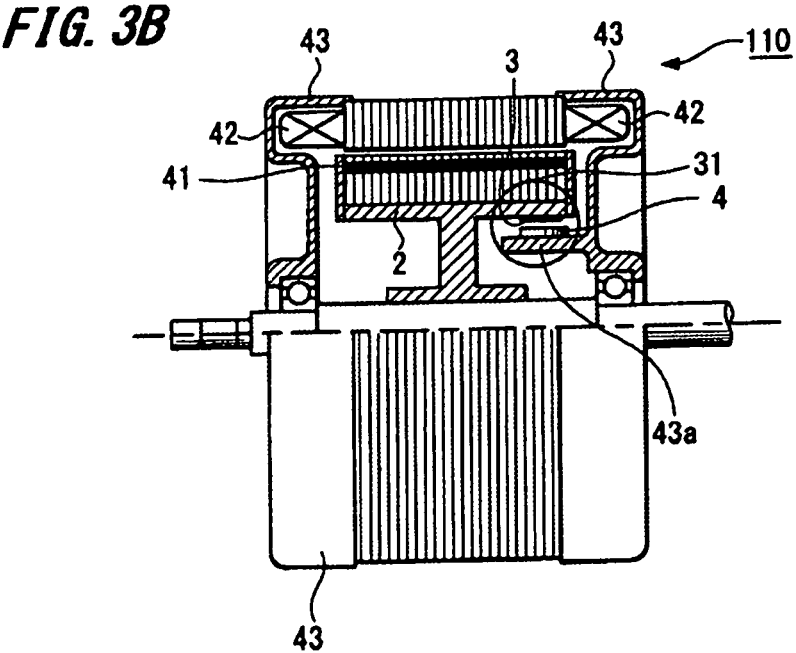
Figure 4A:
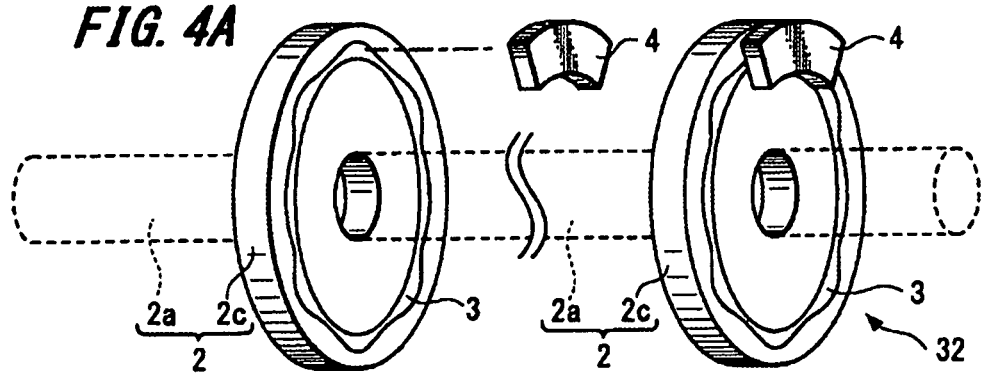
FIGS. 4 A to 4 C are diagrams showing a form of a rotation angle sensor related to the present invention.
Figure 4B:
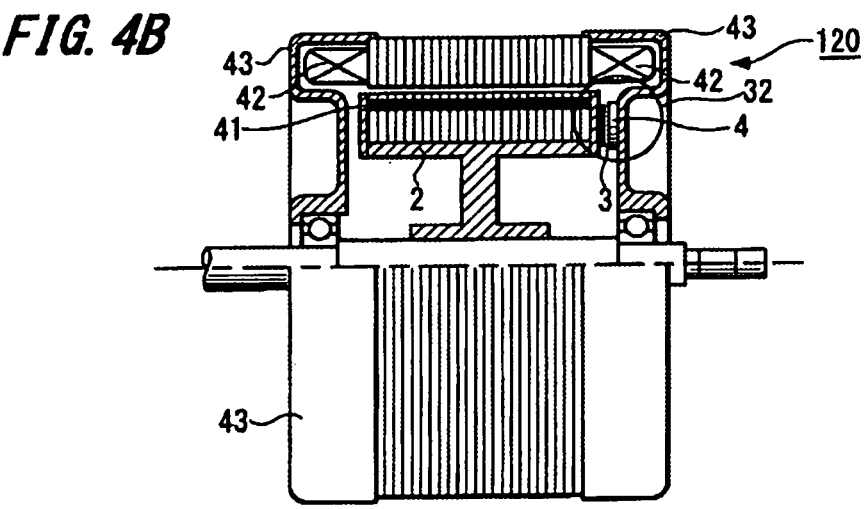
Figure 4C:
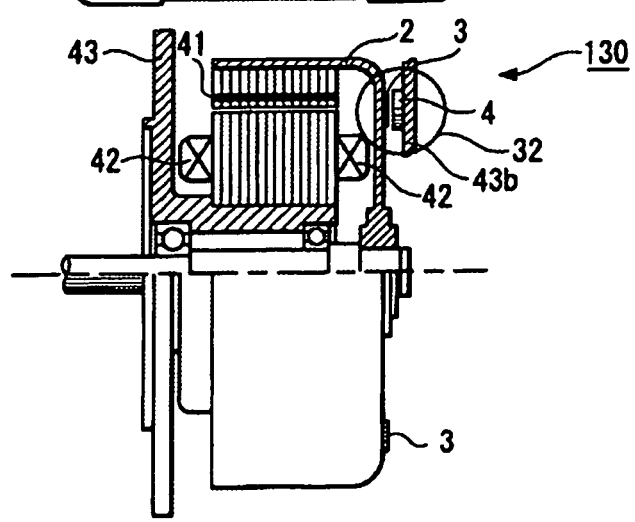
Figure 5A:
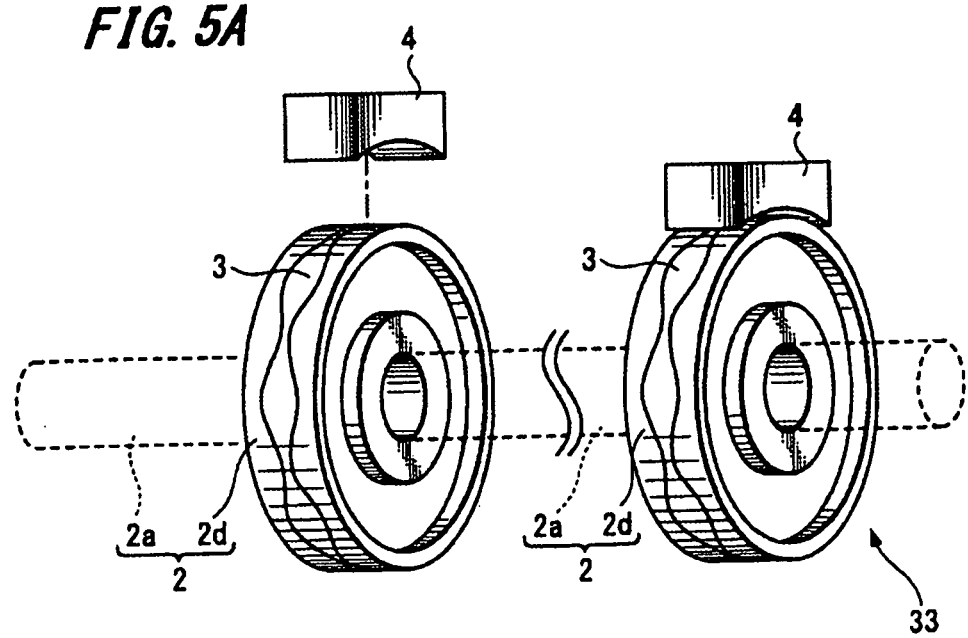
FIGS. 5 A and 5 B are diagrams showing a form of a rotation angle sensor related to the present invention.
Figure 5B:
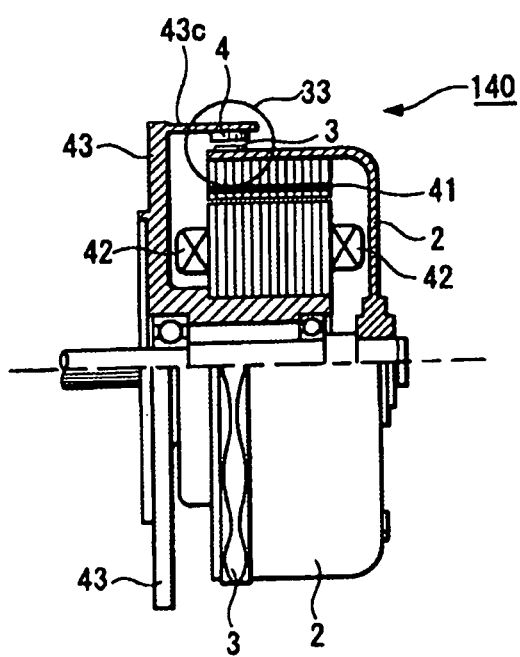

Forms of the rotation angle sensor related to the present invention are shown in FIG. 3 through FIG. 5. Each figure of FIG. 3 to FIG. 5, FIG. A shows an outline configuration diagram (a perspective view of an essential portion) of the rotation angle sensor, and FIG. B shows an installation example (a partially cross-sectional diagram) when the rotation angle sensor of FIG. A is applied to a motor.

Hereinafter, each form is described in further detail.

FIG. 3 show a form of the rotation angle sensor in which the encoder structure 3 is provided in the radial direction and on the side of inner circumferential surface of the rotor 2 and the stationary sensor assembly 4 is disposed in a manner opposing to the encoder structure 3.

FIG. 4 show a form of the rotation angle sensor in which the encoder structure 3 is provided in the axial direction of the rotor 2 (a lateral side of the rotor) and the stationary sensor assembly 4 is disposed in a manner opposing to the encoder structure 3.

FIG. 5 show a form of the rotation angle sensor in which the encoder structure 3 is provided in the radial direction and on the side of outer circumferential surface of the rotor 2 and the stationary sensor assembly 4 is disposed opposingly to the encoder structure 3.

First, in a rotation angle sensor 31 shown in FIG. 3 A, the encoder structure 3 is formed in the radial direction and on the side of inner circumferential surface of the rotor 2, more precisely on an inner circumferential surface of a cylindrical portion 2b of the rotor 2 that is attached to a rotor shaft 2a. Further, the stationary sensor assembly 4 is disposed in the inside in a manner opposing to this encoder structure 3.

It should be noted that the stationary sensor assembly 4 is shown on the left side of FIG. 3 A such that this sensor assembly is disassembled and separated from the rotor 2 and the encoder structure 3. In the following FIG. 4 A and FIG. 5 A, the stationary sensor assembly 4 is also shown in a similar manner.

This rotation angle sensor 31 has a structure that is desirable as an installation example of a radial type sensor to a motor such as a so-called permanent magnet type synchronous motor or permanent magnet type brushless motor of an inner rotor type, which has such a structure that a magnet is disposed on a surface portion of the rotor 2 and the motor has a space in a center portion of the rotor 2, for example. Since the rotation angle sensor 31 has the configuration of FIG. 3 A, the rotation angel sensor 31 can be disposed in the inside of the rotor 2, and accordingly there is such a merit that a shaft length of the motor and the like need not to be increased for the disposition of the sensor.

FIG. 3 B shows an installation example in a case that the rotation angle sensor 31 of FIG. 3 A is applied to a motor of the inner rotor type. The motor shown in FIG. 3 B is the motor of the inner rotor type, more specifically an inner rotor motor 110. This inner rotor motor 110 has such a configuration that a magnet 41 is provided in a surface portion (outer circumferential surface) of the rotor 2 and a stator 43 having a coil 42 is disposed in a manner opposing to this magnet 41. Further, the rotation angle sensor 31 of FIG. 3 A is configured such that the encoder structure 3 is provided in the inner circumferential surface of the rotor 2 and the stationary sensor assembly 4 is disposed in a manner opposing to this encoder structure 3. The stationary sensor assembly 4 is provided in a member 43a that is extended from the stator 43 in a direction parallel with a rotational shaft. The stator 43 is configured to have a stator core that is made of a laminated plate of electromagnetic steel sheets.

Since the motor has the space in the center portion of the rotor 2 and the rotation angle sensor 31 can be disposed in the inside of the rotor 2 as described hereinbefore, it is not necessary to increase the shaft length of the motor 110 for the installation of the rotation angle sensor 31.

In a rotation angle sensor 32 shown in FIG. 4 A, the encoder structure 3 is formed in the axial direction of the rotor 2 (a direction vertical to the radial direction) which means on the lateral side of the rotor 2, more precisely on the lateral side of a plate-like portion 2c of the rotor 2 that is attached to the rotor shaft 2a. Further, the stationary sensor assembly 4 is disposed on the inner side in a manner opposing to this encoder structure 3.

This rotation angle sensor 32 has a structure that is suitable as an installation example of an axial type sensor to a motor having such a structure that a force acts between the stator of the outer side and the rotor 2 of the inner side, for example. More specifically, the stator is disposed on the right outside of the rotor 2 and the motor has the space on the lateral side of the rotor 2 in the motor having the above-described structure. Therefore, since the rotation angle sensor 32 has the configuration of FIG. 4 A, the rotation angle sensor 32 made up of the encoder structure 3 and the stationary sensor assembly 4 can be disposed in this space, and accordingly this sensor has such a merit that manageability in relation to the installation of the sensor is excellent.

FIG. 4 B shows an installation example in a case that the rotation angle sensor 32 of FIG. 4 A is applied to a motor of the inner rotor type (inner rotor motor). An inner rotor motor 120 shown in FIG. 4 B has such a configuration that the magnet 41 is provided in the surface portion (outer circumferential surface) of the rotor 2 and the stator 43 having the coil 42 is disposed in a manner opposing to this magnet 41. Further, the rotation angle sensor 32 of FIG. 4 A is configures such that the encoder structure 3 is provided on the lateral side of the rotor 2 and the stationary sensor assembly 4 is disposed in a manner opposing to this encoder structure 3. The stationary sensor assembly 4 is provided in the stator 43. The other configuration than the configuration around the rotation angle sensor 32 made up of the encoder structure 3 and the stationary sensor assembly 4 is almost similar to the inner rotor motor 110 of FIG. 3 B.

As described hereinbefore, the rotation angle sensor 32 is suitable in a case that the force acts between the stator 43 and rotor 2 of the inner rotor motor 120, in which the coil 42 adjunct to the stator 43 is disposed on the right outside of the rotor 2 and the motor has the space on the lateral side of the rotor 2 so that the rotation angle sensor 32 can be disposed in this space, and therefore the manageability in relation to the installation of the sensor is excellent.

Further, FIG. 4 C shows an installation example in a case that the rotation angle sensor 32 of FIG. 4 A is applied to a motor having a different structure from the inner rotor motor 120 of FIG. 4 B as an example of an alteration. Although the rotor 2 is disposed on the inner side than the stator 43 in the case of the inner rotor motor of FIG. 4 B, the motor shown in FIG. 4 C is an outer rotor motor 130 in which the rotor 2 is disposed on the outer side than the stator 43. This outer rotor motor 130 has such a configuration that the magnet 41 is provided in the inside of the rotor 2 and the stator 43 having the coil 42 is disposed in a manner opposing to this magnet 41. The stator 43 is configured to have a stator core made of a laminated plate of electromagnetic steel sheets. Further, the rotation angle sensor 32 of FIG. 4 A is configured such that the encoder structure 3 is provided on the lateral side of the rotor 2 and the stationary sensor assembly 4 is disposed in a manner opposing to this encoder structure 3. The stationary sensor assembly 4 is provided in a member 43b extending in the direction vertical to the rotational shaft which is connected with the stator 43 at a portion not shown in the figure.

In a rotation angle sensor 33 shown in FIG. 5 A, the encoder structure 3 is formed in the radial direction of the rotor 2 and on the side of outer circumference surface, more precisely on an outer circumferential surface of a ring-shaped portion 2d of the rotor 2 that is attached to the rotor shaft 2a. Further, the stationary sensor assembly 4 is disposed on the outside in a manner opposing to this encoder structure 3.

This rotation angle sensor 33 has a structure that is suitable for a sensor installation in a case such as a permanent magnet type synchronous motor or permanent magnet type brushless motor of an outer rotor type, for example, in which the motor has a space on the outside of the rotor 2, and this rotational angle sensor is classified as the radial type sensor similarly to the rotation angle sensor 31 of FIG. 3 A. Since the rotation angle sensor 33 has the configuration of FIG. 5 A, it is only necessary that the encoder structure 3 is directly formed on the outer circumferential surface of the rotor 2 and the stationary sensor assembly 4 is installed in the disposition opposing to that encoder structure 3, and accordingly this sensor has such a merit that the sensor installation is quite easy.

FIG. 5 B shows a case in which the rotation angle sensor of FIG. 5 A is applied to a motor of the outer rotor type, more specifically an outer rotor motor. An outer rotor motor 140 shown in FIG. 5 B has such a configuration that the magnet 41 is provided in the inside of the rotor 2 and the stator 43 having the coil 42 is disposed in a manner opposing to this magnet 41. The stator 43 is configured to have a stator core made of a laminated plate of electromagnetic steel sheets. Further, the rotation angle sensor 33 of FIG. 5 A is configured such that the encoder structure 3 is provided on the outer circumferential surface of the rotor 2 and the stationary sensor assembly 4 is disposed in a manner opposing to this encoder structure 3. The stationary sensor assembly 4 is provided in a member 43c extending in the direction parallel with the rotational shaft which is connected with the stator 43. The other configuration than the configuration around the rotation angle sensor 33 made up of the encoder structure 3 and the stationary sensor assembly 4 is almost similar to the outer rotor motor 130 of FIG. 4 C.

As described hereinbefore, the motor has the space on the outside of the rotor 2 and it is only necessary that the encoder structure 3 is directly formed on the outer circumferential surface of the rotor 2 and the stationary sensor assembly 4 is installed in the disposition opposing to that encoder structure 3, and therefore the installation of the rotation angle sensor 33 is quite easy.

All the embodiments of the rotation angle sensors explained hereinbefore are structurally characterized in that there is no need for the stationary sensor assembly to straddle the rotational shaft. More specifically, those rotation angle sensors can be installed without change in a conventional structure that has the rotor, the rotational shaft and the like, and there is such an effect that those rotational angle sensors are excellent in versatility since those sensors can be installed to products having a variety of rotational mechanisms.

It should be noted that the rotation angle sensor according to the present invention is not limited to those structural examples and application examples explained hereinbefore but various modifications and alterations can be effected without departing from the scope and spirit of the present invention.

Subsequently, each configuration of the above-described rotation angle sensor is explained in detail by referring to the attached drawings.

Figure 6A:
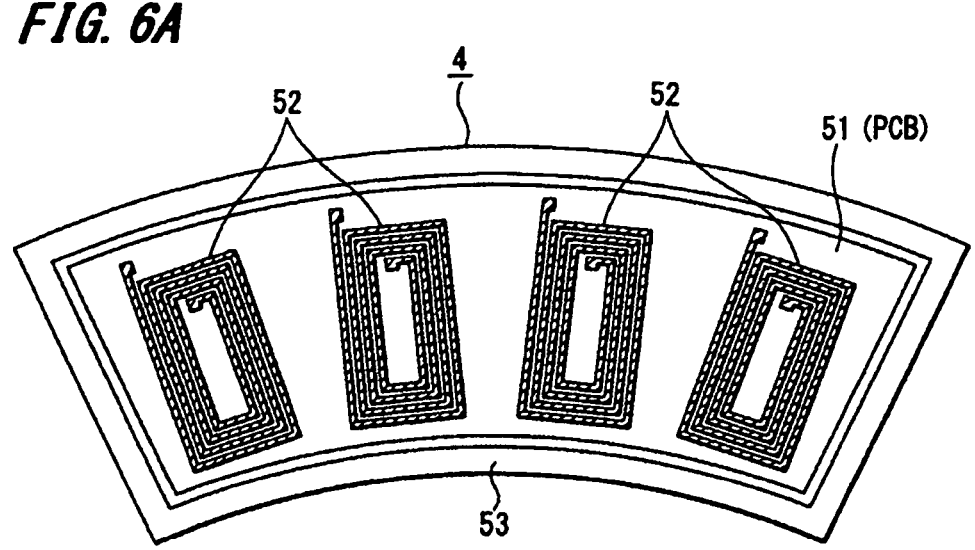
FIGS. 6 A and 6 B are diagrams showing a configuration example of a stationary sensor assembly used in FIG. 4.
Figure 6B:
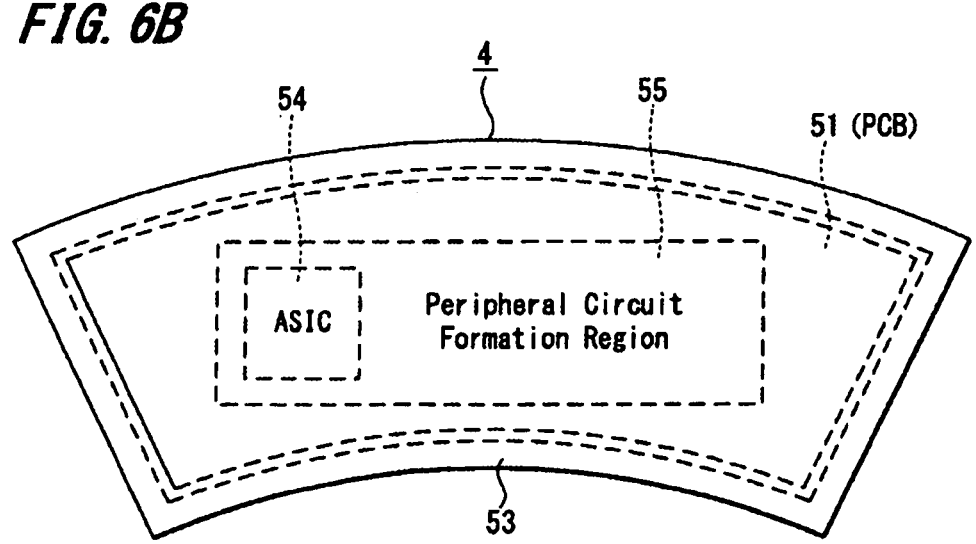

FIG. 6 are diagrams showing a configuration example of the stationary sensor assembly 4 used in FIG. 4, in which FIG. 6 A shows a state representing a front view of the stationary sensor assembly 4 on the side opposing to the encoder structure 3 and FIG. 6 B shows a state representing rear view of the stationary sensor assembly 4.

According to FIG. 6, the stationary sensor assembly 4 in the embodiment of the present invention is configured such that four inductance elements 52 are formed in a front surface of a printed circuit board (PCB) 51; an arithmetic processing ASIC (Application Specific IC) 54 and a peripheral circuit formation region 55, in which a peripheral circuit is formed, are provided in a back surface of the printed circuit board (PCB) 51; and the whole of those respective parts is covered with an exterior case 53. Hereinafter, the respective parts (inductance element, ASIC and PCB) are collectively called an internal sensor.

A non-magnetic/non-conductive material is used for a member of the exterior case 53. This is because a magnetic flux excited by flowing electric current in each inductance element 52 is brought to pass through (affect to) the encoder structure 3 as much as possible so that the eddy current is generated more efficiently. Explaining in further detail, it is desirable that a resin-molded body having high strength and excellent thermal resistance is adopted in the exterior case 53 assuming such a case that the rotation angle sensor is also used under severe conditions of use environment such as an automobile use.

Here, in a case that each inductance element 52 is disposed in a manner opposing to the encoder structure 3, the inductance element 52 may be formed in an exposed state and may be enclosed with a filling material and a covering body. Furthermore, the internal sensor may be molded to seal in the exterior case 53 by applying an overmolding process method, and various alterations are possible depending on a use environment and usage of this rotation angle sensor.

Also, a plurality of inductance elements, ASICS, and other peripheral circuits that assume a role of a practical sensor function portion are formed/mounted in such a general electronic circuit substrate that is represented by a polyimide substrate, a laminated substrate made of glass, fabric, epoxy resin as a base material, and the like. More specifically, since the internal sensor is modulated so that a size reduction can be realized and a production can be performed stably by using general electronic circuit technology/mounting technology and the like, this internal sensor also has such a merit that a cost reduction can be achieved.

In General, it is necessary to achieve a high level of accuracy for both of relative disposition accuracy among the respective inductance elements and disposition accuracy between the inductance elements and the encoder structure in order for the rotation angle sensor having the plurality of inductance elements to realize excellent sensing accuracy, however the plurality of inductance elements are formed integrally by using a multilayer structure of the printed circuit board (PCB) having the coil pattern formed therein as described later according to the rotation angle sensor related to the present invention, and therefore a disposition condition of high accuracy can be easily satisfied by considering only the positional accuracy between the encoder structure and the internal sensor (or stationary sensor assembly).

Figure 7A:
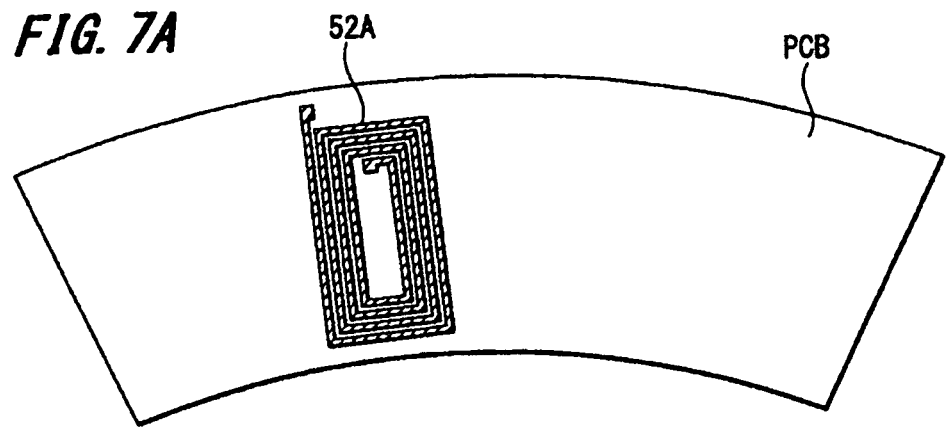
FIGS. 7 A to 7 C are diagrams showing configuration examples of plural inductance elements.
Figure 7B:
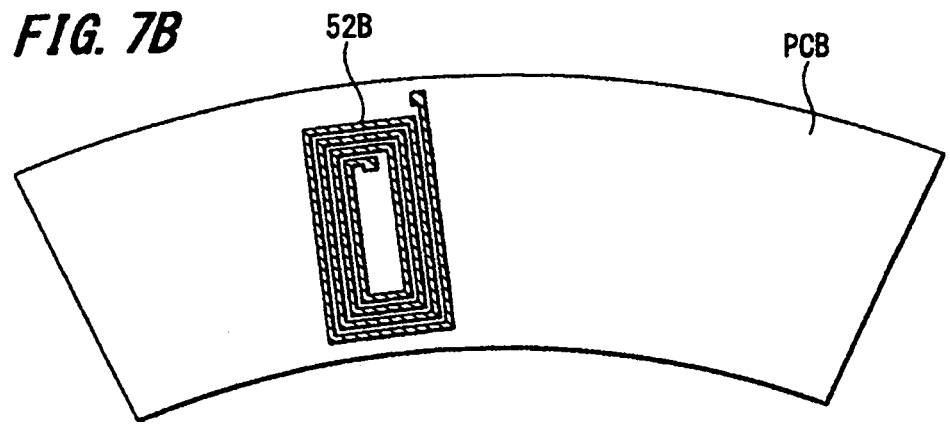
Figure 7C:
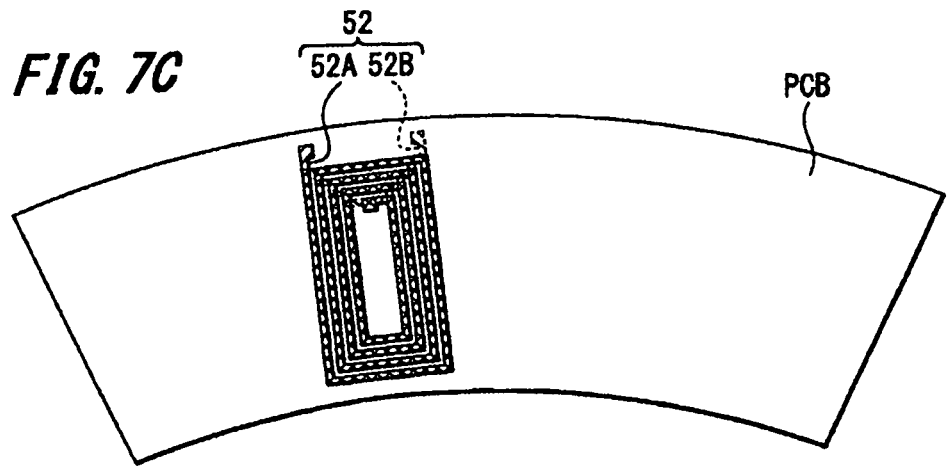

Subsequently, a configuration of each inductance element is explained in detail by referring to FIG. 7. Although FIG. 7 are diagrams to show configuration examples of plural inductance elements, one of the four inductance elements 52 shown in FIG. 6 A is illustrated exemplarily for the convenience of explanation. At this time, FIG. 7 A shows a coil pattern 52A of one side that is formed on a surface of the PCB opposing to the encoder structure 3, and FIG. 7 B shows a coil pattern 52B the other side that is disposed in a lower layer of the PCB having the coil pattern 52A of FIG. 7 A formed therein. Further, FIG. 7 C shows a state representing an overview of a structure in which the coil patterns 52A and 52B of one side and the other side shown in FIG. 7 A and FIG. 7 B are laminated. In FIG. 7 C, an outer circumference of the coil pattern 52B of the other side formed in the lower layer is shown with a broken line.

It is shown in FIG. 7 A through FIG. 7 C that each of the plurality of inductance elements has the multilayer structure in which the plurality of PCBs having the coil patterns formed therein are laminated.

The inductance elements 52 (52A, 52B) having a two-layer structure is used in this embodiment, but it is only necessary that the number of coil turns required for exciting a desired magnetic flux is set by adjusting the number of laminated layers of the coil patterns.

At this time, the coil patterns 52A and 52B of one side and the other side shown in FIG. 7 have a mutually inverse relation, and therefore there is such a merit that the coil patterns 52A and 52B are easily formed in the PCB.

Also, the inductance element 52 is formed into a planar structure (planar form) and is disposed in a manner opposing to a plane of the encoder structure 3 which is described later. Thereby, an extent of influence of the magnetic flux excited by the inductance element 52 becomes large to the encoder structure 3 and, as a result, the eddy current is generated efficiently so that an improvement of the sensing accuracy can be expected.

Further, the inductance element 52 related to this embodiment is configured as the inductance element 52 having a rectangular air-core portion without adopting such a magnetic core that is included in a general inductance element (coil component). This is because the inductance to be required can be set low since the rotation angle sensor related to the present invention is driven by a drive frequency of comparatively high frequency from approximately 500 kHz to approximately 5 MHz. More specifically, since there is no need of a heavily weighted magnetic core, there is quite a big effect in terms of weight reduction of the rotation angle sensor.

Here, the inductance elements of the multilayer structure using the PCB is explained as the example in this embodiment, however it is obvious that even a wire-wound type coil, for example, can obtain a similar effect to this embodiment if the coil is wound on an air core in a planar form and a plurality of such wire-wound type coils can be accurately disposed on the PCB.

Figure 8:
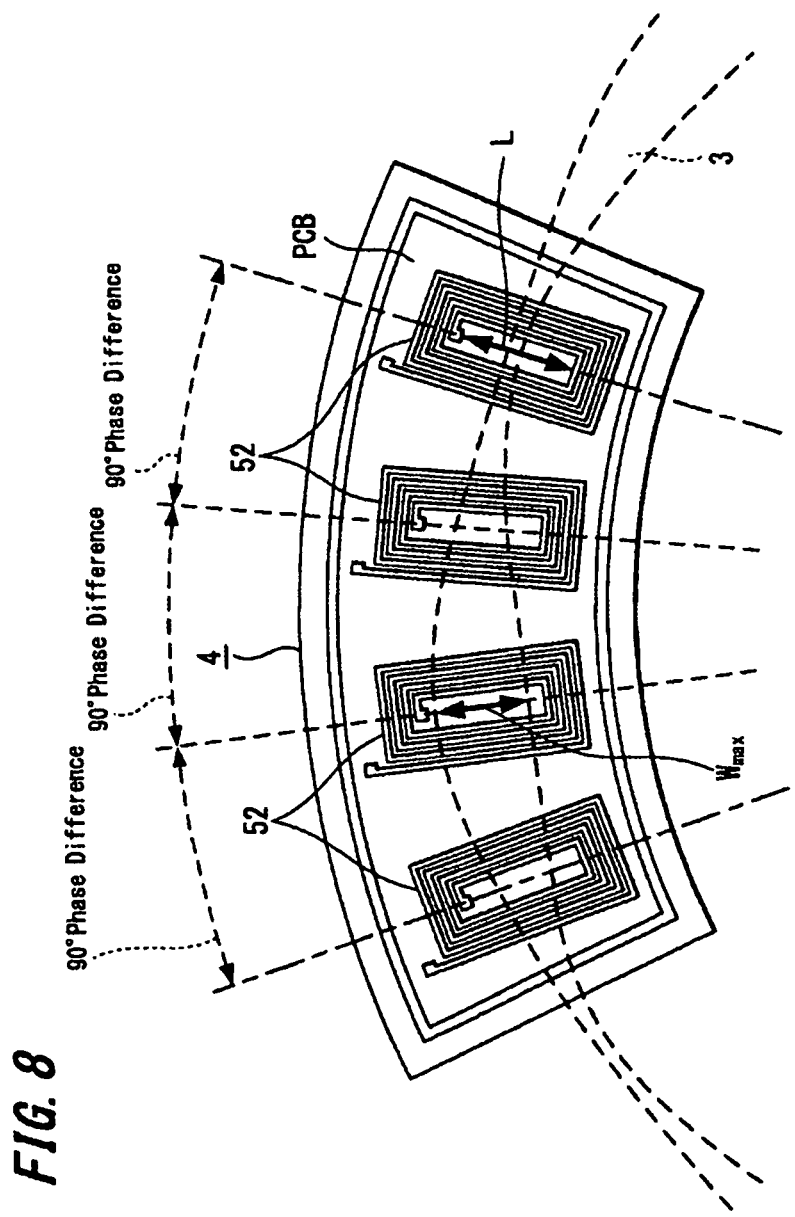
FIG. 8 is a diagram showing a state in which plural inductance elements and an encoder structure are disposed in an opposing manner.

FIG. 8 is a diagram showing a state in which the plurality of inductance elements 52 of the stationary sensor assembly 4 are disposed in a manner opposing to the encoder structure 3.

The respective inductance elements 52 are disposed in a manner corresponding to a phase difference 90° of a periodical change in the width of the encoder structure 3. Then, the phase difference of the whole four inductance elements 52 is 90°×3=270°.

At this time, each of the plurality of inductance elements 52 is formed such that a lengthwise dimension L of the air-core portion is larger than a maximum width dimension Wmax of the encoder structure 3. Since the inductance elements 52 are set on such dimensional condition, it is possible to increase a degree of generation of the eddy current that is generated in the encoder structure 3 when the magnetic fluxes are generated by the inductance elements 52 and, as a result, an improvement of the sensing accuracy can be expected.

Another reason of setting the dimensional condition of the air-core portion as described above is explained here. In a case that the air-core portion of the inductance element 52 is set on a condition like a square and a circle in which a lengthwise dimension and a widthwise dimension are equal, an eddy current generating region of the encoder structure 3 opposing to the individual inductance element 52 is expanded more than necessary and there occurs such a possibility that the mutually adjacent inductance elements 52 overlap the eddy current generating regions. Because of the above, there is such a possibility that the sensing accuracy is deteriorated and a measurement/detection error is increased.

Due to the reason described in the above, it is desirable that the following (condition 1) is satisfied as the condition of forming the air-core portion of the inductance element 52 and the encoder structure 3, which means in other words that not only the rectangular shape but also an oval shape and the like can be adopted as the shape of the air-core portion of the inductance element as long as the following condition is satisfied.

> Lengthwise dimension of air-core portion of inductance element>Widthwise dimension of air-core portion of inductance element
>
> Lengthwise dimension of air-core portion of inductance element>Maximum width dimension of encoder structure (Condition 1)

For example, the value of W may be determined on the basis of the diameter of a via, which may be used to route the lead to another layer of the PCB.

Thus for present PCB techniques typical values may be: W=1.28 mm, wide W=0~2 mm. However, other values may be used as appropriate.

With respect to the condition for "Lengthwise dimension of air-core portion of inductance element >Maximum width dimension of encoder structure", the sensor's performance and its robustness against tolerance and runout of the encoder structure may be adjusted or determined by this condition.

For example, typical values may be: L=11.3~14.5 mm in combination with Wmax=11.0 mm, wide L=5.2~25 mm (or larger) in combination with Wmax=5.0~20 mm (or larger)

In some embodiments, a trapezoid shape for the coils may be used in axial sensor configurations.

Subsequently, another example of the inductance element suitable for the rotation angle sensor related to the present invention is explained. FIG. 9 show an example of another form of the inductance element.

FIG. 9A shows a coil pattern 52C of one side that is formed on the surface of the PCB opposing to the encoder structure 3 as the example of another form of the inductance element 52, and FIG. 9B shows a coil pattern 52D of the other side that is disposed in the lower layer of the PCB having the coil pattern 52C of FIG. 9A formed therein. Further, FIG. 9C shows a state representing an overview of a structure in which the coil patterns 52C and 52D of one side and the other side in FIG. 9A and FIG. 9B are laminated. In FIG. 9C, an outer circumference of the coil pattern 52D of the other side in the lower layer is shown with a broken line.

As noticed from FIG. 9A through FIG. 9B, the coil patterns 52C and 52D of one side and the other side to form the inductance element 52 are formed such that those coil patterns are disposed in a manner not mutually overlapping with partial exception, which is a different point from the coil patterns 52A and 52B shown in FIG. 7.

Here, the coil patterns 52A and 52B shown in FIG. 7 have such configuration that stray, capacitance is easily generated between the coil patterns of the upper layer and lower layer, which means that the inductance: L and the stray capacitance: C constitutes the parallel resonance circuit when being perceived as an electrically equivalent circuit. At this time, in a case that the stray capacitance: C increases, the resonance frequency of the inductance element 52 shifts toward a lower frequency. However, an impedance: Z in the resonance frequency becomes the maximum in a case of the L-C parallel resonance circuit, and therefore a resistance component becomes high when the voltage is impressed at the frequency from approximately 500 kHz to approximately 5 MHz in order to drive the inductance element 52. As a result, there occurs such a possibility that the magnetic field strength necessary for generating the eddy current are not obtained sufficiently and the sensing accuracy is deteriorated.

On the other hand, according to the configuration of the coil patterns 52C and 52D shown in FIG. 9, the resonance frequency can be maintained at a high frequency since it is possible to reduce the stray capacitance C that is generated between the coil patterns 52C and 52D of the upper layer and lower layer of the PCB at the time of flowing the electric current in the inductance element 52. Accordingly, there is such an effect that the strength of the magnetic field generated by the magnetic flux excited by the inductance element 52 can be increased.

Next, the encoder structure related to this embodiment is explained in detail by referring to FIG. 10. FIG. 10A shows a state representing a front view of the encoder structure 3 of the radial type that is used for the rotation angle sensor 31 of FIG. 5A, and FIG. 10B shows a state representing a front view of the encoder structure 3 of the axial type that is used for the rotation sensor 32 of FIG. 4A.

The encoder structure 3 shown in FIG. 10A or FIG. 10B is configured such that each has the conductivity and the eddy current is generated by receiving the magnetic flux excited by the above-described inductance element 52, and is installed in a manner making a rotational movement along with the rotational body such as the rotor 2.

A conductive metal material such as aluminum, steel, copper and silver can be listed as a material used suitably for the encoder structure 3. Here, it is only necessary that the material is selected appropriately according to use conditions of the rotation angle sensor such that aluminum, which excels in antirust effect, is used if it is assumed that this sensor is used in such a situation that there exist concerns about high humidity and brine damage, for example.

Also, the encoder structure 3 is formed into such a shape that the sine-wave curves are disposed symmetrically as shown in FIG. 10 A, which means in other words that the encoder structure 3 is formed such that the width dimension thereof increases and decreases periodically at specific positions when the rotational body such as the rotor 2 makes the rotational movement.

On the other hand, the encoder structure 3 shown in FIG. 10 B is formed such that the width dimension thereof increases and decreases periodically although this structure is not configured to dispose the sine-wave curves symmetrically, and therefore such encoder structure 3 as shown in FIG. 10 A or FIG. 10 B is defined as a sine-wave curve type in the present invention. It should be noted that a range equivalent to one phase in the periodical change of the encoder structure 3 is shown in FIG. 10 A and FIG. 10 B, respectively.

Figure 11A:
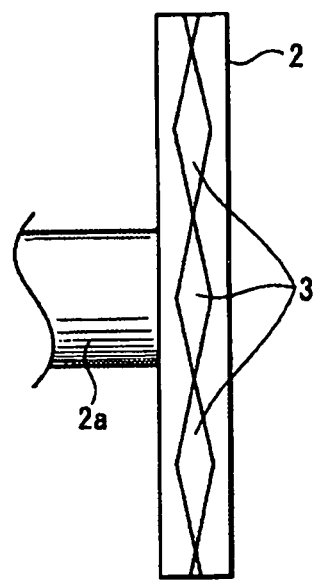
FIGS. 11 A and 11 B are diagrams showing other configuration examples of encoder structures.
Figure 11B:
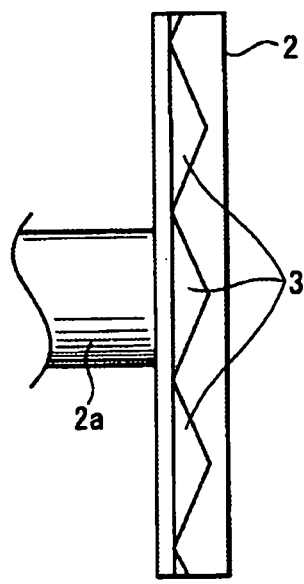

Here, the encoder structure 3 is not limited to the sine-wave curve type but may be formed into a diamond as shown in FIG. 11 A, a triangle as shown in FIG. 11 B, or a shape equivalent thereto. Also, this encoder structure may be not only configured such that the width continuously changes as shown in the figure but also configured such that the width changes stepwise though not shown in the figure.

The encoder structure 3 in the example of this embodiment shown in FIG. 10 B has eight regions where the width dimension increases or decreases. Those eight regions are to be called an eight-phase configuration for the convenience of explanation hereinafter.

In the present invention, such phase configuration does not give any influence to the practical sensing accuracy and can be increased or decreased simply in consideration of a diameter of the rotational body and manufacturing conditions.

More precisely, in a case that the rotational body has a large diameter such as a rotor of an electric generator in an electric power plant; for example, it is quite difficult to form the encoder structure of one-phase to such rotational body. Therefore, it is only necessary that the encoder structure equivalent to one-phase, which has the shape and dimension to be manufactured easily, is prepared in plural number so that those encoder structures are assembled into the rotor.

On the other hand, the encoder structure having a multi-phase configuration is difficult to form in the rotational body in a case of a small rotary machine. Therefore, it is only necessary to form the encoder structure having at least one-phase or more.

Since the encoder structure configured as described above adopts the conductive material and has the simple shape, it is possible to apply various manufacturing methods as described below.

As a typical example, there can list such processing that masking matched to the shape of the encoder structure is applied to the rotational body and thereby an electroplating method, a metal vapor deposition method, a sputtering method, and a screen print method are applied thereto. The above-described processing is suitable for mass production, and therefore it is possible to obtain the encoder structure of a fixed quality. At this time, the above-described screen print method may adopt such a state that a paste made from a kneaded mixture of conductive material powder, resin, solvent and the like is printed/dried or may adopt such a state that baking is performed after the print/dry.

Also, a plate-like member and a thin body member formed into a desired shape by stamping process/cutting-out process may be used as the encoder structure. In this case, the encoder structure can be easily installed through such a means as a bonding fixture that is performed while placing a positioning jig fittingly on the rotational body, and therefore the encoder structure can be installed without change in the configuration of the conventional rotational body and has a merit that this encoder is excellent in versatility.

Figure 12:
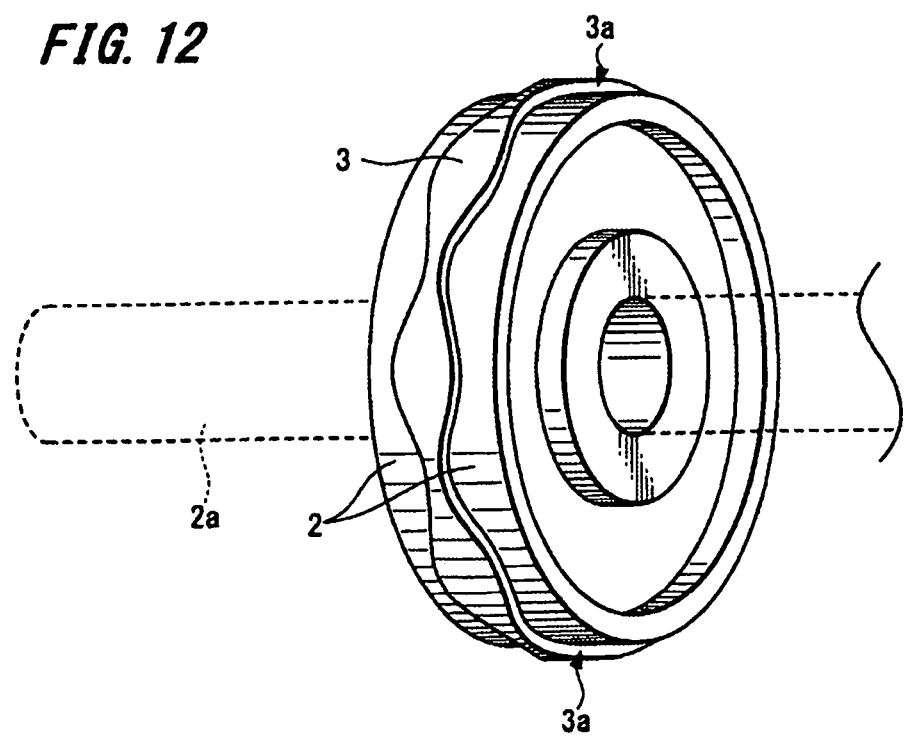
FIG. 12 is a diagram showing a configuration example in a case that an encoder structure is formed in one's own rotational body.

Further, in a case that the rotational body has the conductivity, the encoder structure may be formed in the radial direction or in the axial direction of one's own rotational body as shown in FIG. 12, and a casting/cutting process and the like are suitable in this case. When the encoder structure is installed in the rotational body by using the aforesaid means, the following conditions need to be considered.

In a case that the rotational body has the conductivity, for example, the conductivities of the rotational body and encoder structure are relatively compared, and the encoder structure can be directly formed on the rotational body by using the aforesaid electroplating method, metal vapor deposition method, sputtering method, screen print method and the like in a case that the conductivity of the encoder structure is larger than that of the rotational body. It is needless to say that the encoder structure can be also formed directly on the rotational body in a case that the rotational body has no conductivity.

Also, in a case that the encoder structure 3 and the rotational body such as the rotor 2 are formed integrally as shown in FIG. 12, it is desirable that a level difference 3a having a desired dimension is provided between the encoder structure 3 and the rotational body.

As a method for setting the dimension of this level difference 3a, such a method is listed as a practical example that a depth where the magnetic flux excited by the inductance element passes through in the inside of the rotational body is grasped beforehand by a magnetic field analysis simulation based on the conductivity of the rotational body, structural condition of the inductance element, impressed current/voltage conditions, and the like.

Therefore, the minimum value of the level difference of the encoder structure in such configuration is not necessarily limited to any specific value, and also there is no specific need to prescribe the maximum value of the level difference as long as the maximum value is decided according to a dimensional restriction of a machine on which the rotation angle sensor is mounted.

In the following an embodiment of the circuit configuration of the sensor assembly will be described.

Next to the sensor systems 5, including the coils L1, L2 and L3, L4 the circuit 8 is provided for performing the evaluation or calculation of the differential signals. In the embodiment shown the circuit 8 first generates the output signals 10.

Figure 13A:
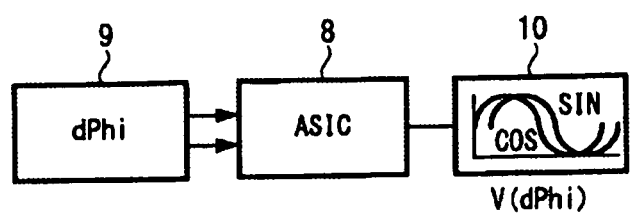
FIGS. 13 A-13 C schematically illustrate the operational behaviour of circuits used in embodiments of the present invention so as to evaluate the difference in phase, the difference in amplitude and the difference in frequency, respectively.
Figure 13B:
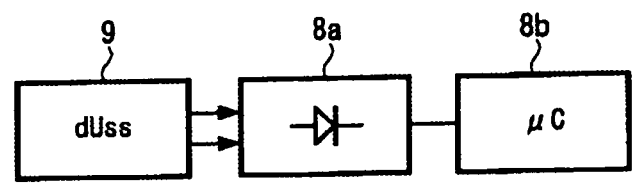
Figure 13C:
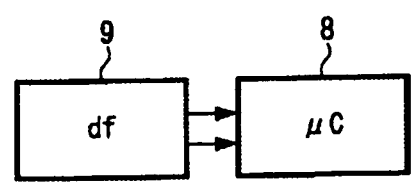
Figure 14:
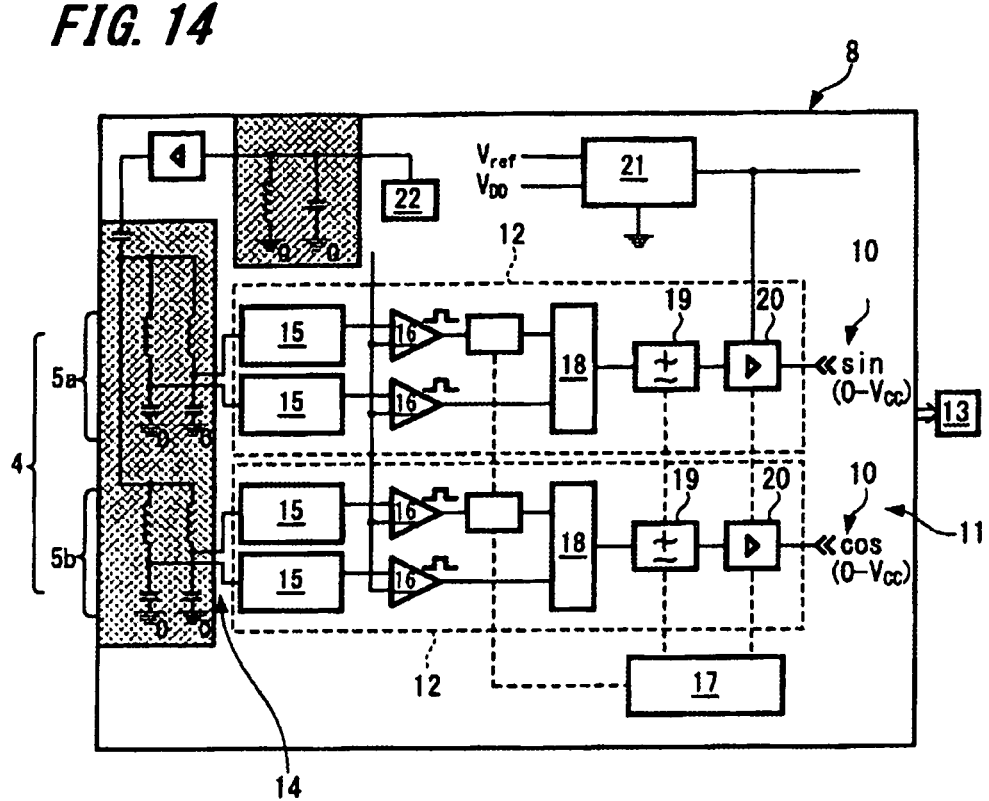
FIG. 14 illustrates a block diagram of an embodiment of the circuits shown in FIG. 13 A.

FIG. 13 A schematically illustrates the operational behaviour of an embodiment of the circuit 8 used in the present invention. In this embodiment the circuit 8 is provided in the form of an ASIC (application specific integrated circuit), which is illustrated in FIG. 14 in more detail according to one illustrative embodiment. The circuit 8 operates so as to generate an analogue voltage V (dphi) 10 at the circuit output 11 from the phase difference 9, which is indicated as dphi, of the resonant circuits 6a, 6b of the first and second sensor systems 5a, 5b. As shown in FIGS. 2 and 13 A the voltage 10 at the circuit output 11 comprises a sinusoidal signal "sin" and a cosinusoidal signal "cos".

In FIG. 13 B the different signals 9 of the sensor systems 5a, 5b are denoted as dUss, which are converted into corresponding amplitude difference signals in a first stage 8a, and subsequently these signals are supplied to a second evaluation stage 8b, which may be provided in the form of a microcontroller or the like in order to determine the desired position information therefrom.

FIG. 13 C illustrates a further embodiment in which the difference signals 9 are obtained as differences in frequency df, for instance on the basis of an arrangement of the sensor systems 5a, 5b, as shown in FIG. 1 E. The differential signals 9 may again be supplied to an evaluation circuit 8, for instance a microprocessor or the like. When using a microprocessor possibly provided internal resources, such as an ADC and the like, may be used in order to allow the processing of the signals 9. Also other dedicated components may be used which may be incorporated, depending on the application, in one or more integrated circuits.

FIG. 14 illustrates a block diagram of the circuit 8 according to one embodiment of the present invention, corresponding to the signal processing of FIG. 13 A. It should be appreciated that the dotted areas shown in FIG. 14 represent external components and are not part of the circuit 8.

As described above, the phase relationship of the encoder structure 3 attached to the rotor 2 and the corresponding sign of the phases will be determined on the basis of the sensor systems 5a, 5b. The sensor systems 5, which are illustrated in FIG. 14 on the lefthand side in a dotted manner, output the sensor signals 9 in the embodiment shown so as to correspond to a phase difference dphi, which is received by the circuit 8 at the circuit input 14. Using the modules 15, the received sensor signals 9 are amplified and filtered. Thereafter, the comparators 16 convert the analogue signals after amplification and filtering into digital signals by comparing the input voltages with a reference voltage $V_{ref}$, wherein a high level and a low level, respectively, are generated only.

If an amplitude of value zero is obtained in this process this signal will not further be processed. A control circuit 17 may enable the control of internal components of the circuit 8, such as the filters 19, and the like.

The generated digital signals will be further processed by exclusive-OR gates 18, which generate square signals having a high fraction of harmonics. The output signals of the exclusive-OR gates 18 are then supplied to low pass filters 19. The output signals of the low pass filters 19 are output to buffer stages 20, which also receive a voltage signal $V_{cc}$ of 5 V±10% from the voltage regulator 21. The buffer stages 20 output a sinusoidal signal sin and a cosinusoidal signal cos as an analogue voltage 10 at the circuit output 11.

As shown in FIG. 14 the signals dphi output by the sensor systems 5 are processed in two symmetric channels 12. Each of the channels comprises an amplifier and a filter 15 for each of the resonant circuits 6a, 6b, two comparators 16 for the output signals of the amplifier and filter 15, an exclusive-OR gate 18 for combining the signals of the comparators 16, a low pass filter 19 for the output signal of the exclusive-OR gate 18 and a buffer stage 20 for outputting the analogue voltage signals, that is, the sinusoidal and cosinusoidal signals 10.

In order to provide an accurate measurement system for sophisticated environmental conditions the temperature stability of the circuit 8 is high and the EMI sensitivity of circuit 8 is maintained at a low level. Furthermore, it may be advantageous to provide the output voltages 10 corresponding to the phase position, as very precise signals in view of possible offset deviations.

Downstream of the circuit 8 is provided a calculating module 13 that is configured to combine the sinusoidal signal sin, the cosinusoidal signal cos of the output voltages 10 into an inverse tangent signal. In this way a linear output signal is obtained from which the position of the encoder structure 3 and thus of the rotor 2 may directly be deduced.

Figure 15:
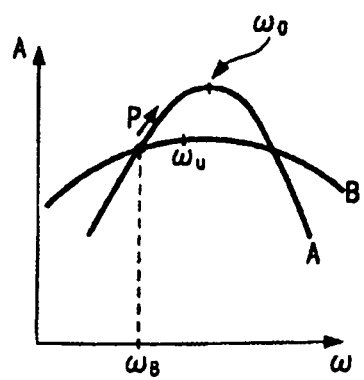
FIG. 15 schematically illustrates how an optimised variation of amplitude may be achieved according to the present invention.
Figure 16A:
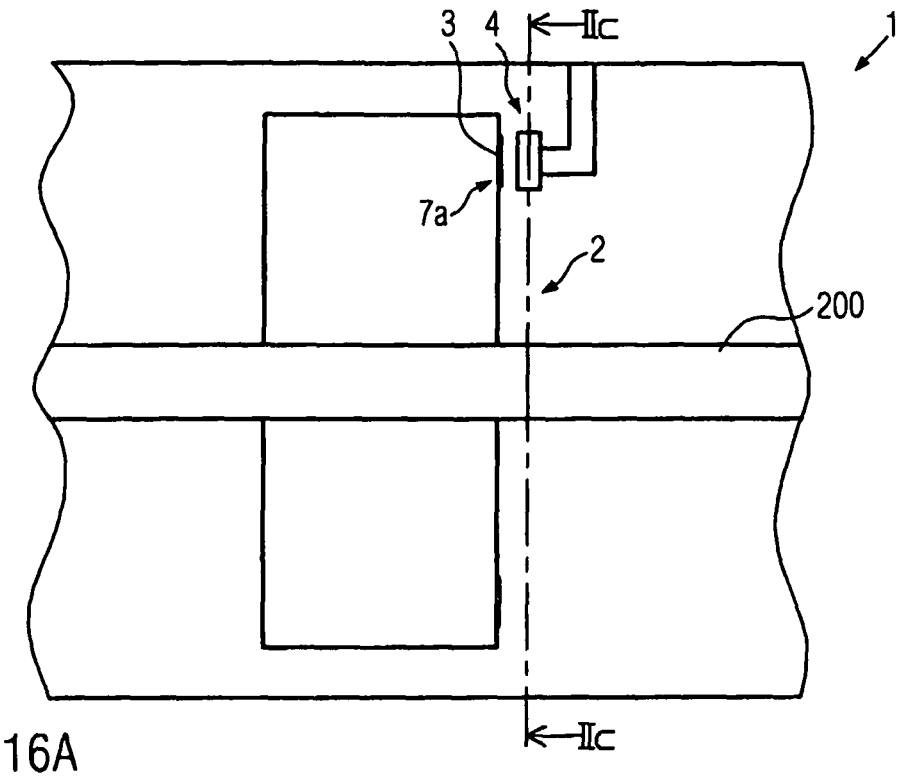
FIGS. 16 A, 16 B schematically illustrate an axial positioning of a sensor system.
Figure 16B:
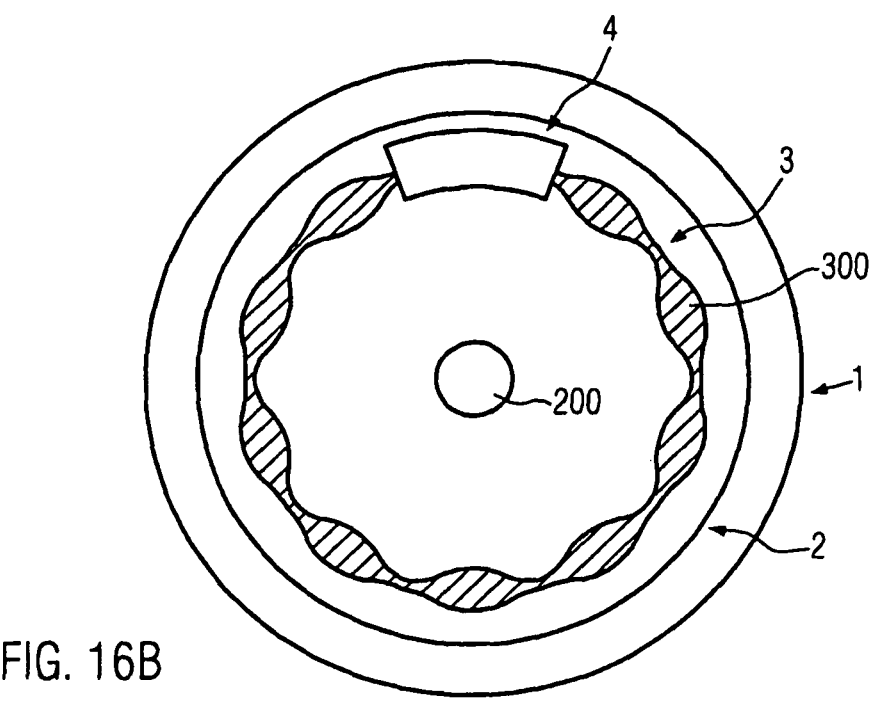
Figure 16C:
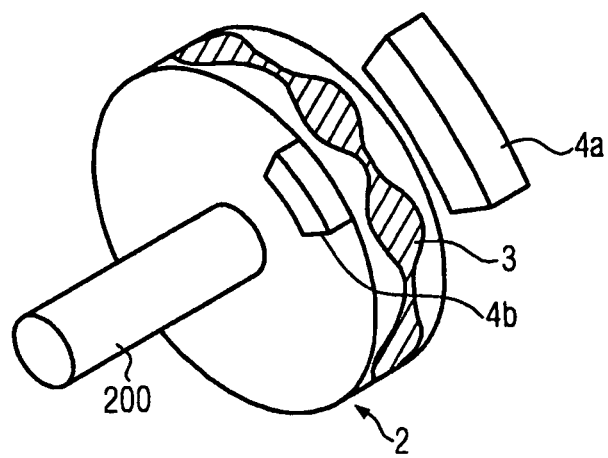
Figure 16D:
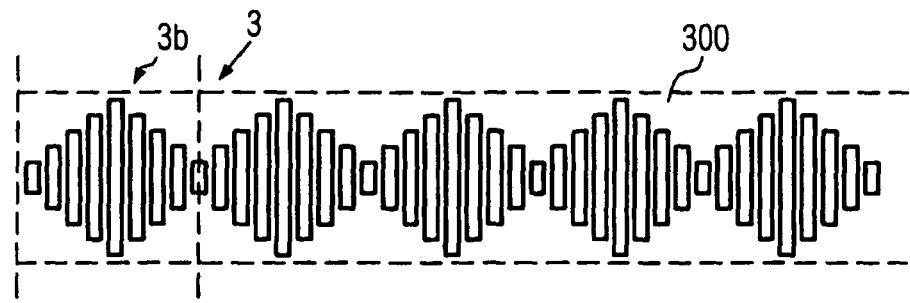
Figure 16E:
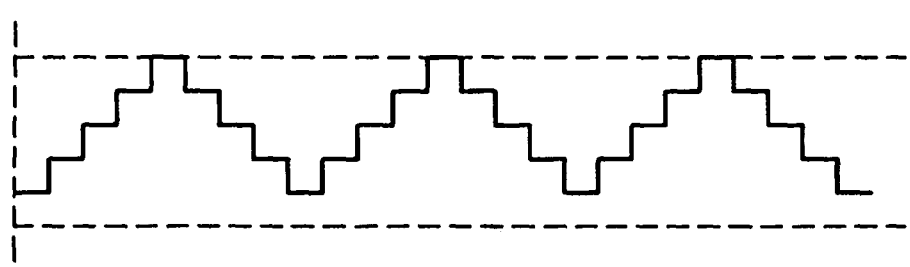
Figure 16F:
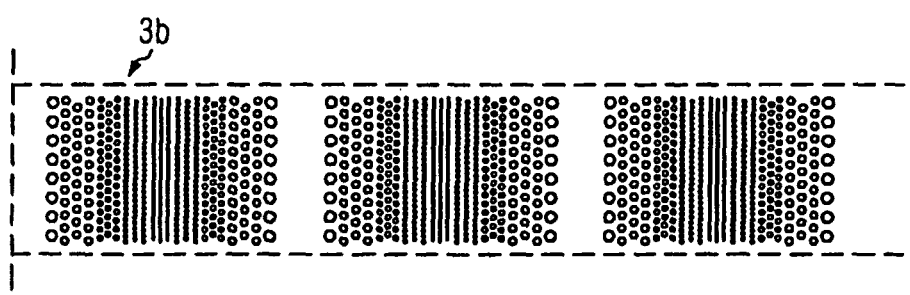
Figure 16G:
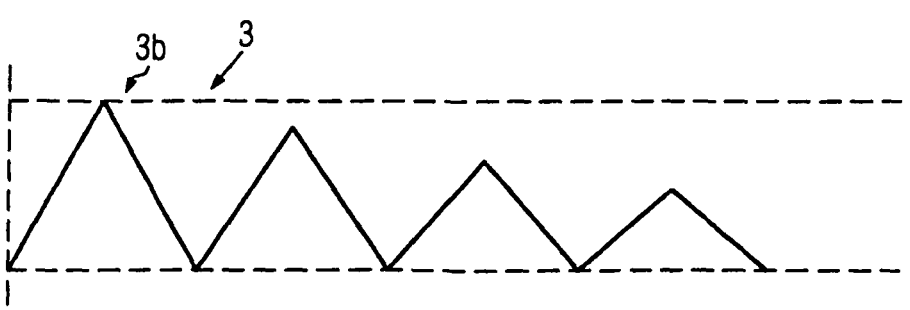
Figure 16K:
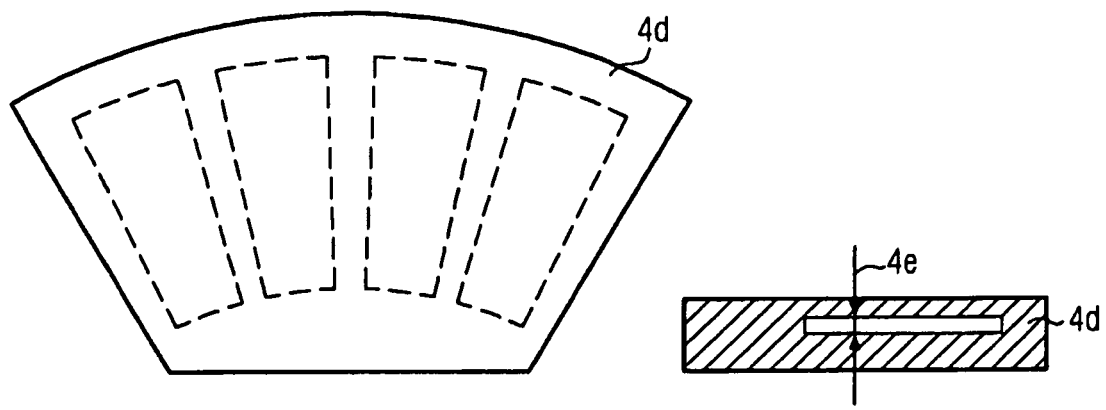
Figure 16L:
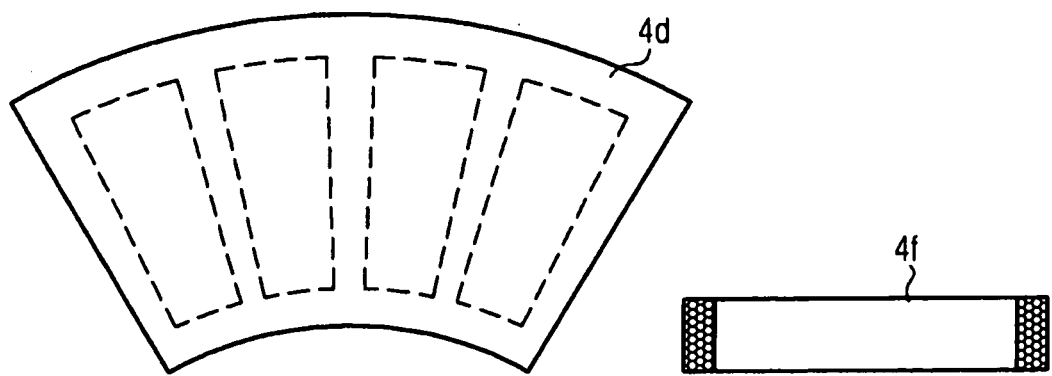
Figure 16M:
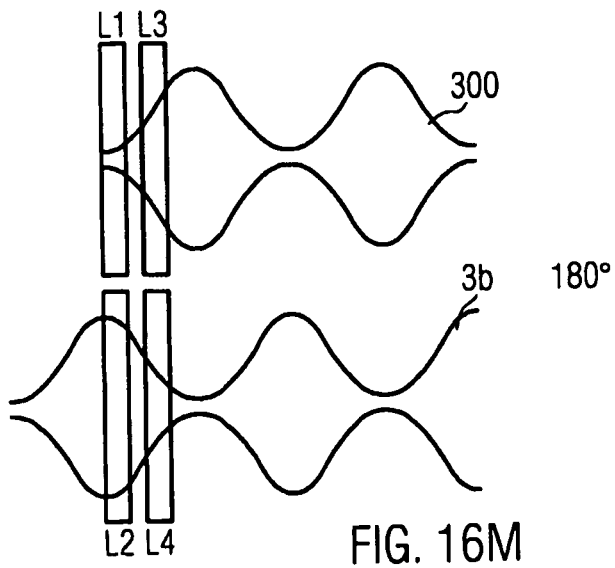
Figure 16N:
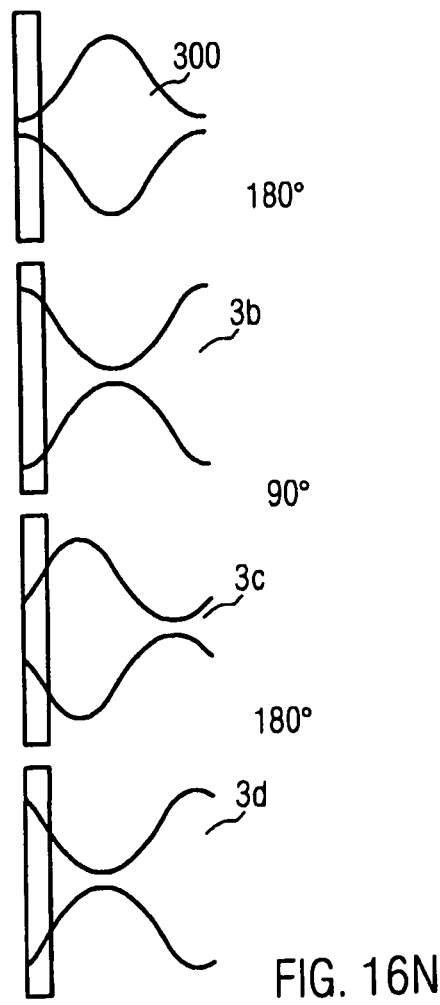
Figure 16O:
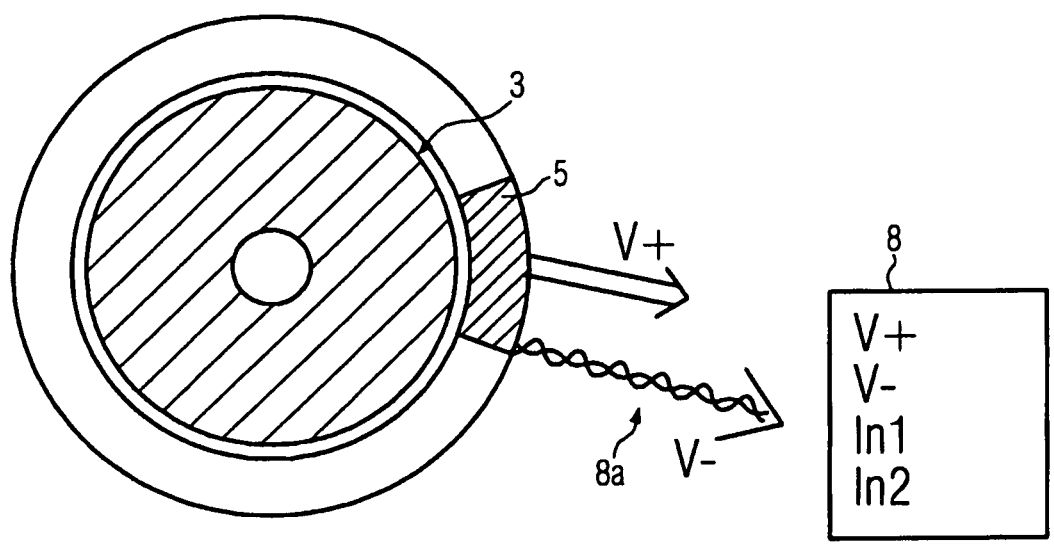

FIG. 15 schematically illustrates how an optimized amplitude dependency may be obtained on the basis of the present invention. FIG. 15 illustrates the sensitivity, for instance in the form of the amplitude, with respect to the operating frequency ω of the resonant circuits 6a, 6b. As is evident from FIG. 15 the sensitivity of the resonant circuits 6a, 6b is highest at the corresponding resonant frequency. Curve B schematically illustrates the progression of the amplitude for the case of a small distance of the encoder structure 3 with respect to the respective sensor coils. In this case the damping effect of the encoder structure 3 is high and results in a resonant frequency $\omega_u$ of the damped system, wherein the resonant frequency deviates from the non-damped or low-damped resonant frequency $\omega_0$ (Curve A). Upon passing the encoder structure 3 respective differences of the amplitude occur, which may efficiently by evaluated by the coils due to the generally low distance from the encoder structure 3. Upon enlarging the distance, for instance due to manufacturing tolerances and the like, the average damping effect upon passing the encoder structure is significantly lower and thus for a fixed operating frequency also the sensitivity upon changing of the damping effect by the shape of the encoder structure is reduced. In this case the loss of sensitivity in the differential signal may be compensated to a certain degree by appropriately selecting the operating frequency $\omega_B$ higher, that is, the operating point P is located closer to the "mean" resonant frequency of the damped system having, on average, a lower degree of damping so that nevertheless sufficiently high differential signals may be obtained. That is, even for an increased average distance resulting in total in a reduced damping upon passing the encoder structure, by increasing the operating point P corresponding to the operation frequency $\omega_B$ a relatively intensive differential signal may be obtained.

If an increased distance of the encoder structure 3, for instance caused by a runout or an imbalance of the encoder ring 7, resulting in a lower damping of the sensor assembly 4, the sensitivity may be increased by an appropriate selection of the operating point P more closely at the mean resonant frequency $\omega_0$ as is illustrated by the arrow in FIG. 15, thereby increasing the output signal such that the angular position of the rotor 2 may be detected with sufficient accuracy. In this way a change in distance between the encoder structure 3 and the sensor assembly 4 may, for instance, be about 2 mm and nevertheless a sufficient high amplitude may be achieved. As the position of the bearing of the rotor 2 and thus the encoder structure 3 attached thereto may vary in the radial direction, also a variation in the axial direction may occur. It is thus possible that the encoder structure 3 moves away from the sensor assembly 4 so that the corresponding opposing relationship is non-ideal. Depending on the circumstances axial tolerances of a few millimeters may occur. For this case the design of the coils of the inductances L1, L2 may appropriately be adapted in order to balance tolerances of for instance 5 mm.

The sensor systems 5 may be designed in any appropriate configuration and may, depending on the position of the encoder structure 3, be in a radial or axial relationship with respect to the rotor 2. Depending on the arrangement of the encoder structure 3 and the associated sensor assembly 4 the sampling of the encoder structure 3 may be performed on the radially inner side and the radially outer side and also in an axial direction.

In the present embodiment of the invention the sensor systems 5 are positioned in close proximity to each other, for instance with a distance of a few millimeters in order to eliminate an imbalance of the encoder ring 7 by means of a substantially identical amplitude change of the differential signals, for instance the sinusoidal and cosinusoidal voltages.

In the embodiment shown the sensor systems 5 are provided at a rotor of a rotary electric machine. In other embodiments the encoder structure 3 and the sensor systems 5a and/or 5b may be provided at any objects moving relatively to each other which are denoted herein in general as a moveable part and a stator in order to determine the position and/or the direction of movement of the moveable part. For instance, the position and the direction of a linear drive system may be detected. Furthermore, the moveable part may be provided with a single sensor system 5a or 5b, when the direction of movement has not to be determined or may be determined by other means. Hence, an efficient means for angular measurements and/or distance measurements is provided in which a high degree of robustness with respect to interference compared to pure magnetic systems may be achieved on the basis of a change in inductance by, among others, eddy current losses in the encoder structure.

Based on the rotor encoder, as described in some of the embodiments, the angular position of parts rotating relatively to each other and in particular the angular position of a rotor of an electric machine may be determined in a non-contact and a highly robust manner, by which a control of electric machines, for instance permanently excited machines, asynchronous machines, and the like, may be performed by using a robust and cost-efficient sensor system in a highly efficient manner.

For example, the angular position of 0 to 360°, which may be obtained on the basis of the signal of the encoder system, may substantially correspond to a period of a sinusoidal current commutation of a synchronous machine corresponding to the number of pole pairs in the stator. If for example the synchronous machine comprises seven pole pairs the period of the angle detection may repeat seven times from 0 to 360° during one mechanical turn, which corresponds to an angle of 51.43°.

The inventive system for detecting the position of a moveable part, in particular the angular position of a rotor, as well as the method associated therewith, are particularly advantageous when applied to starter/generator applications in the automotive field, in which the circuit 8 is exposed to harsh environmental conditions and the inductive position sensor has to be insensitive with respect to high motor currents up to 1 000 Ampere. Moreover, the sensor system according to the present invention may advantageously be applied in electric drive systems provided in vehicles, for instance in hybrid drive trains or pure electric drives, since the electronic commutation of permanently excited synchronous motors or brushless DC motors or the control of asynchronous machines may be performed.

With reference to FIGS. 16 A to 16 O and also referring to the previous figures further illustrative embodiments will now be described.

FIG. 16 A schematically illustrates an axial arrangement of the sensor assembly 4 and of the encoder structure 3, which is formed on an appropriate carrier material 7a or which may be directly formed in a base material of the rotor 2 positioned on an axel 200. A base material of the rotor 2 is to be understood as a material provided for making the rotor 2 operational. For instance, a base material may be a material for supporting components, such as magnets and the like.

FIG. 16 B illustrates a section along the line IIc-IIc of FIG. 16 A, wherein the encoder structure 3 in this embodiment comprises a single track 300 that extends periodically across an entire mechanical revolution of the rotor.

FIG. 16 C schematically illustrates a radial arrangement, wherein in one embodiment, the encoder structure 3 is positioned in the radial direction between the axel 200 and a sensor assembly 4a, thereby forming a radial "outer" configuration. If the encoder structure 3 is "read out" from the "interior" by means of the sensor assembly 4b, a respective inner lying configuration is provided. For this purpose, the encoder structure 3 may be provided on an inner surface of a ring or any other component of the rotor 2.

FIG. 16 D schematically illustrates a further embodiment of the encoder structure 3, wherein for convenience the track 300 is illustrated in a linear manner. The position dependent conductivity of the encoder structure 3 is created by blocks of conductive material having a varying lateral extension perpendicular to the direction of motion, in the direction of motion, i.e. in the horizontal direction of FIG. 16 D. The individual blocks may be connected such that a step function is obtained, wherein the step function may represent an approximation of a desired function, for instance a sinusoidal function. In this case, an individual section 3b represents a single period, in which precise information of the position of the rotor 2 is required for controlling the machine 1. By "digitizing" the shape of the track 300 within the individual sections 3b, the corresponding manufacturing process may be simplified, wherein the lateral size of the individual blocks, i.e. the dimension in the direction of motion, may be adapted to the desired resolution within the individual sections 3b.

FIG. 16 E illustrates an approximation of a step-shaped function approximating a triangular shape as one example.

FIG. 16 F illustrates an embodiment of the encoder structure 3, wherein the width of the track 300 is substantially constant, at least within each section 3b, wherein the modulation of the conductivity is obtained by changing the area fraction of the conductive material with respect to conductive material. For instance, recesses or holes of varying density and/or size may be formed in a strip of conductive material, for instance by etching, drilling, and the like. In this way, the amount of conductive material contributing to the generation of eddy currents along the direction of motion may efficiently be adjusted, wherein this patterning may be accomplished by using highly precise manufacturing techniques. Moreover, this patterning technique may also efficiently be applied directly to the material of the rotor 2, without providing an additional carrier material.

FIG. 16 G schematically illustrates an embodiment of the encoder structure 3, in which further information is obtained in a single track 300 in addition to the position information within a single section 3b, wherein the further information allows the identification of at least some of the sections 3b. In the embodiment shown, an intended offset is provided such that the maximum extension or the maximum amount of the conductive material is changed at least in some sections. This type of an additional encoding, which may also be considered as an "amplitude modulation" of the output signals, may also be used in combination with other embodiments of the encoder structure 3. In particular, the embodiment shown in FIG. 16 G may obtain a change of the averaged conductivity within individual sections by adapting the density and/or the size of the respective recesses or cavities in an appropriate manner.

FIG. 16 H schematically illustrates an embodiment, in which the encoder structure 3 is provided in or on the carver material 7a. In this case, the carrier material 7a may be a conductive material, for instance d, or may represent an insulating material. Even when using a conductive carrier material, which may be the base material of the rotor 2, an appropriate modification of the conductivity in the encoder structure may be achieved. For example, the track 300 may be formed of a material having an increased conductivity, for instance, the track 300 may be formed of copper and the like so that in this material of increased conductivity higher eddy currents may be induced compared to the surrounding material of the reduced conductivity. Similarly, a material of reduced conductivity or an insulating material may be used so as to obtain the desired modulation of the conductivity. As shown, the material of the track 300 may be provided with a thickness of approximately 2 micrometers to 50 micrometers, depending on the characteristics of the material of the track 300. In case of a highly conductive material of the track 300 a thickness D of a few micrometers may be sufficient, while a conductor of reduced conductivity or an insulator may advantageously be provided with an increased thickness D, so as to obtain an increased distance of the material provided under the track 300 with respect to the sensor assembly 4.

In FIGS. 16 I-16 L further embodiments with respect to the structure of the coils 4a are shown.

In FIG. 16 I, the coil 4a has a planar configuration, wherein individual windings of the coil 4a in the form of conductive material or conductive lines are provided in a lateral manner within a single plane. In the right-hand part or figure, a section is illustrated, in which a carrier material, such as a printed wiring board, is provided on which the individual windings are formed in a single plane. In other examples, several windings may be provided on different layers of a carrier material, such as a multilayer printed board. Furthermore, the carrier material may be provided in the form of a flexible material 4c so that the planar coils may be manufactured with a curvature, as may be advantageous for a radial arrangement, as is shown in FIGS. 16 A and 16 B.

FIG. 16 J illustrates a planar configuration, wherein the windings are formed of a conductive material substantially without a carrier material. For this purpose, a material such as a copper sheet material, an aluminium sheet material, and the like, may be punched into the desired shape.

FIG. 16 K illustrates an embodiment, in which the coil 4a is integrated in a material 4d, which increases the integrity of the coil even at sophisticated environmental conditions. For this purpose, the coil 4a including a carrier material 4b or without a carrier material may be injection-moulded with an appropriate material so that the desired stability may be achieved. During the process of injection moulding it is not necessary to completely embed the coil in the material 4d, but the surface of the conductors may remain uncovered or the coverage of the coil may only be small so that in combination with the thickness 4e of the material 4d a desired gap with respect to the encoder structure 3 is obtained.

FIG. 16 L illustrates the coil 4a in the form of a wound coil, wherein the windings are formed on a carrier material 4f. These wound coils 4a may, if required, be arranged on or within the material 4d in a desired manner, as is also described above.

FIG. 16 M illustrates an embodiment of the sensor assembly 4 having four sensor coils L1, . . . , L4 having a similar function, as is described with reference to FIG. 2. In this case, two tracks 300, 3b are provided which have a spatial phase shift of 180° with respect to an individual area under consideration. Therefore, the coils L1, L2, which define a sensor assembly 5a may be positioned at the same position with respect to the direction of motion. The same holds true for the coils L3, L4, which define a second sensor assembly 5b. Moreover, the coils L1, L3 are spatially offset to each other by 90°, and the coils L2, L4 are also spatially offset by 90° so that output signals may be obtained, as it is described above. In this way, the lateral size of the sensor systems 5a, 5b may be reduced.

FIG. 16 N illustrates a further variant, in which four tracks 300, 3b, . . . , 3d are read out by individual coils L1, . . . , L4, wherein the desired spatial phase shift is realised by the design of the tracks 300, . . . , 3d. That is, if the coils L1 and L2, i.e. the sensor system 5a, read out the tracks 300 and 3b, these tracks have a phase shift of 180°. The same holds true for the tracks 3c and 3d. Furthermore, the tracks 3b and 3c have a phase shift of 90°.

The embodiments shown, in which several tracks 300, . . . , 3d are provided, shall represent examples in which at least one track has a different spatial periodicity or may not have a periodic configuration at all, compared to the other tracks. Hence, one or more of the tracks 300, . . . , 3d may be used for evaluation on the basis of a coarser spatial resolution. For this purpose, this track may be sampled by an appropriate sensor assembly, as is discussed above with respect to the individual tracks 300. In this way, for instance, the position across an entire mechanical revolution of the rotor 2 may be obtained, wherein the fine resolution is determined by the variation within a period of the encoder structure, for instance within a 360° sinusoidal variation.

FIG. 16 O illustrates a further embodiment, in which the sensor assembly 5 is connected with the circuit 8 via a cable connection that is configured such that a reduced sensitivity to interferences when supplying respective output signals of the sensor assembly 5 to the circuit 8 is obtained. For example, at least connecting lines for conducting the output signals may be provided with a shielding or may be provided as twisted pairs. Due to the cable connection the sensor assembly 5 may be positioned at any desired position within the machine 1, without requiring a robust construction of the circuit 8 for tolerating the environmental conditions prevailing within the machine 1. For instance, moderately high temperatures may occur in the vicinity of the sensor assembly 5, for instance 150° C. or higher, which would require special measures for the circuit 8, thereby contributing to increased costs. For example, integrated circuits designed for high temperatures are significantly more expensive. By providing the cable connection 8a an efficient thermal decoupling may be accomplished, or the circuit 8 may be disposed outside of respective interfering fields. For this purpose, the sensor assembly may be constructed of circuit components, which may have only a small temperature dependence, that is, a sensor assembly may lack semiconductor components, so that the position detection may not essentially be affected by external influences. In one embodiment the sensor assembly is configured such as it is described with reference to FIG. 2, so that external influences acting on all components in the same manner, such as the temperature, may efficiently be reduced or compensated for by taking the difference of the respective output signals.

DESCRIPTION OF REFERENCE NUMERALS

1—ELECTRIC MOTOR; 2—ROTOR (MOVING PART), 2a—ROTOR SHAFT, 3—ENCODER STRUCTURE, 4—SENSOR ASSEMBLY, 5, 5a, 5b—SENSOR SYSTEM, 6a, 6b—RESONANCE CIRCUIT, 7—ENCODER RING, 8—CIRCUIT, 9—SENSOR SIGNAL, 10—ANALOGUE VOLTAGE, 11—CIRCUIT OUTPUT PORTION, 13—CALCULATION MODULE, 14—CIRCUIT INPUT PORTION, 15—AMPLIFIER AND FILTER, 16—COMPARATOR, 17—CONTROL UNIT, 18—EXCLUSIVE OR GATE, 19—LOW PASS FILTER, 20—BUFFER STAGE, 21—VOLTAGE REGULATOR, 31, 32, 33—ROTATION ANGLE SENSOR, 41—MAGNET, 43—STATOR, 51—PRINTED CIRCUIT BOARD (PCB), 52—INDUCTANCE ELEMENT, 53—EXTERIOR CASE, 54—ASIC, 55—PERIPHERAL CIRCUIT FORMATION REGION, 110, 120—INNER ROTOR MOTOR, 130, 140—OUTER ROTOR MOTOR, C-a, C-b—CAPACITOR, cos—COSINE-WAVE SIGNAL, L1, L2, L3, L4—INDUCTANCE ELEMENT, P—OPERATION POINT, A—AMPLITUDE, R-a, R-b—RESISTOR, sin—SINE-WAVE SIGNAL, V—AC VOLTAGE SOURCE, $\omega_0$—RESONANCE FREQUENCY, $\omega_B$—OPERATION FREQUENCY, $\omega_U$—RESONANCE FREQUENCY HAVING STRONG ATTENUATION, Os1, Os2—OSCILLATOR; 300, 3 B, 3 C, 3 D—TRACK, 200—AXLE, 8A—CABLE CONNECTION, 4 D—BASE MATERIAL, 4 E—THICKNESS OF COILS, D—THICKNESS OF CONDUCTOR, 4 A—COIL, WINDING, 4 B—CARRIER MATERIAL

The invention claimed is:

1. A system for detecting the position of a rotor of a machine, the system comprising an encoder structure attached to the rotor and moveable together with the rotor, and a stationary sensor assembly positioned opposite to the encoder structure and providing at least one sensor signal, from which the position may be determined,
wherein the sensor assembly comprises a planar-shaped first inductive component and is configured to generate a magnetic field and detect the generated magnetic field, the generated magnetic field being affected by the encoder structure, and the encoder structure is configured to cause a position dependent change of inductance of the inductive component,
wherein a core-free portion of said first inductive coil component has a width extending along a direction of motion of said encoder structure and a length extending perpendicular to said width, wherein said width is less than said length and wherein said length is greater than a maximum width of an encoder on said encoder structure, and
wherein the encoder structure comprises an electrically conductive material having a width periodically changing with respect to an angular position.

2. The system according to claim 1, wherein the electrically conductive material is sinusoidal, triangular or partially rectangular in shape.

3. The system according to claim 1, wherein the sensor assembly comprises a first resonant circuit and a first inductive component is a part of the first resonant circuit.

4. The system according to claim 3, wherein the sensor assembly has a second resonant circuit including a second inductive component and wherein the first and the second resonant circuits form a first sensor system.

5. The system according to claim 1, wherein the first inductive component is used as a part of a first oscillator.

6. The system according to claim 5, wherein a second inductive component is provided, which is used as a part of a second oscillator, and wherein the first oscillator and the first inductive component, the second oscillator and the second inductive component form a first sensor system.

7. The system according to claim 6, wherein the sensor assembly comprises a second sensor system offset to the first one.

8. The system according to claim 7, wherein the first and second sensor systems are identical in construction.

9. The system according to claim 7, wherein the first and second sensor systems are positioned in close proximity to the sensor assembly such that the encoder structure influences the first and the second sensor systems in substantially the same manner.

10. The system according to claim 1, wherein a circuit which converts the sensor signal into a signal at the circuit output is arranged downstream of the sensor assembly, said signal containing angular information.

11. The system according to claim 10, wherein the circuit is configured to obtain the signal containing the angular information from a phase difference and/or an amplitude difference and/or a frequency difference of the sensor signal.

12. The system according to claim 10, wherein the circuit comprises symmetric channels for receiving and processing components of the sensor signal of the sensor assembly.

13. The system according to claim 4, wherein the first and second inductive components of the first and second resonant circuits are positioned to output output signals having a phase shift to each other.

14. The system according to claim 1, wherein an AC voltage source (V) having a frequency (f) between approximately 500 KHz and approximately 5 MHz is provided, said AC voltage source being coupled at least with the first inductive component.

15. The system according to claim 14, wherein the first and second resonant circuits are adjusted to the frequency (f) of the AC voltage source (V).

16. The system according to claim 15, wherein the first and second resonant circuits are adjusted to the frequency of the AC voltage source on the basis of a distance between the encoder structure and the sensor assembly.

17. The system according to claim 3, wherein the first resonant circuit is a series resonant circuit.

18. The system according to claim 3, wherein the first resonant circuit is a parallel resonant circuit.

19. The system according to claim 10, wherein the circuit comprises a first module generating a sinusoidal signal (sin) and a cosinusoidal signal (cos), and wherein the circuit comprises a calculating module calculating an inverse tangent function from the sinusoidal signal (sin) and the cosinusoidal signal (cos).

20. A rotation angle detection sensor system comprising:
a rotational body;
an encoder structure that is attached rotatably along with said rotational body; and
a stationary sensor assembly that has at least one or more inductance elements and that is disposed in a manner opposing to said encoder structure while having an interval thereto, wherein the stationary sensor assembly is configured to generate a magnetic field and detect the generated magnetic field, the generated magnetic field being affected by the encoder structure,
wherein said one or more inductance elements are formed into a planar shape,
wherein a core-free portion of said inductance elements has a width extending along a direction of motion of said encoder structure and a length extending perpendicular to said width, wherein said width is less that said length and wherein said length is greater than maximum width of an encoder trace formed on said encoder structure, and wherein the encoder structure comprises an electrically conductive material having a width periodically changing with respect to an angular position.

21. The rotation angle detection sensor system according to claim 20, wherein said stationary sensor assembly is driven at a frequency that is prescribed in a range from 500 kHz to 5 MHz.

22. The rotation angle detection sensor system according to claim 20, wherein said stationary sensor assembly includes at least said inductance element and an integrated circuit to calculate a rotation angle by performing arithmetic processing on a signal outputted from said inductance element.

23. The rotation angle detection sensor system according to claim 20, wherein said electrically conductive material is configured to have a planar portion of at least one or more phase, a width dimension of which changes periodically.

24. The rotation angle detection sensor system according to claim 23, wherein said planar portion of said encoder structure is disposed vertically to a radial direction of said rotational body.

25. The rotation angle detection sensor system according to claim 24, wherein said encoder structure is formed on an outer circumferential surface of said rotational body.

26. The rotation angle detection sensor system according to claim 24, wherein said encoder structure is formed on an inner circumferential surface of said rotational body.

27. The rotation angle detection sensor system according to claim 23, wherein said planar portion of said encoder structure is disposed vertically to an axial direction of said rotational body.

28. The system according to claim 1, wherein a length of the encoder structure extends along a circumferential direction of the rotor, and the width of the encoder structure extends perpendicular to the length of the encoder structure.

29. The rotation angle detection sensor system according to claim 20, wherein a length of the encoder structure extends along a circumferential direction of the rotor, and the width of the encoder structure extends perpendicular to the length of the encoder structure.

* * * * *